(12) United States Patent
Robinson et al.

(10) Patent No.: US 11,629,042 B2
(45) Date of Patent: Apr. 18, 2023

(54) CARTRIDGE VALVE AND SYSTEM

(71) Applicant: Lancer Corporation, San Antonio, TX (US)

(72) Inventors: Robert Louis Robinson, Universal City, TX (US); Brandon Ojeda, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 0 days.

(21) Appl. No.: 17/408,914

(22) Filed: Aug. 23, 2021

(65) Prior Publication Data

US 2022/0055885 A1 Feb. 24, 2022

Related U.S. Application Data

(60) Provisional application No. 63/069,572, filed on Aug. 24, 2020.

(51) Int. Cl.
*B67D 1/12* (2006.01)
*B67D 1/00* (2006.01)

(52) U.S. Cl.
CPC .... *B67D 1/1281* (2013.01); *B67D 2001/0094* (2013.01)

(58) Field of Classification Search
CPC ...... B67D 1/0037; B67D 1/0085; B67D 1/12; B67D 1/14; B67D 1/1281; B67D 2001/0094; F16K 27/029; F16K 31/0658; F16K 1/36; F16K 31/0644; B65D 90/58; B65D 90/587
USPC ........................................ 222/559, 287, 309
See application file for complete search history.

(56) References Cited

U.S. PATENT DOCUMENTS

| | | | |
|---|---|---|---|
| 4,015,626 A | 4/1977 | Thordarson | |
| 4,134,572 A | 1/1979 | Schmidt | |
| 4,218,669 A | 8/1980 | Hitchcock | |
| 4,741,355 A | 5/1988 | Credle | |
| 5,842,679 A | 12/1998 | Kolchinsky | |
| 5,855,355 A | 1/1999 | Grunert | |
| 5,967,487 A * | 10/1999 | Cook | F16K 31/0693 251/64 |
| 6,026,850 A | 2/2000 | Newton | |
| 6,209,578 B1 | 4/2001 | Newton | |
| 6,684,901 B1 | 2/2004 | Cahill | |
| 7,315,230 B2 | 1/2008 | Hoffman | |
| 7,445,021 B2 | 11/2008 | Newton | |
| 7,617,839 B2 | 11/2009 | Newton | |
| 7,814,931 B2 | 10/2010 | Newton | |
| 8,459,218 B2 | 6/2013 | Keller et al. | |
| 10,774,943 B2 * | 9/2020 | Landacre | F16K 31/0658 |
| 2009/0038690 A1 | 2/2009 | Zur | |
| 2009/0301580 A1 | 12/2009 | Hillhouse | |
| 2013/0206793 A1 | 8/2013 | Minica et al. | |

(Continued)

OTHER PUBLICATIONS

PCT/US2021/047154. International Search Report, Written Opinion of the ISA, and the examiner's search strategy and results.

*Primary Examiner* — Vishal Pancholi
*Assistant Examiner* — Robert K Nichols, II

(57) ABSTRACT

A cartridge valve (22, 94) and system (10) are provided in which the cartridge valve (22, 94) includes a regulator (44, 96) and an adjustable stroke solenoid (42, 100) to facilitate stable flow control. Also, the cartridge valve (22, 94) includes a quick and easy installation and removal fitting (30 and 32).

20 Claims, 21 Drawing Sheets

(56) References Cited

U.S. PATENT DOCUMENTS

2019/0316704 A1    10/2019    Landacre et al.
2021/0206616 A1    7/2021    Hartsfield \* cited by examiner

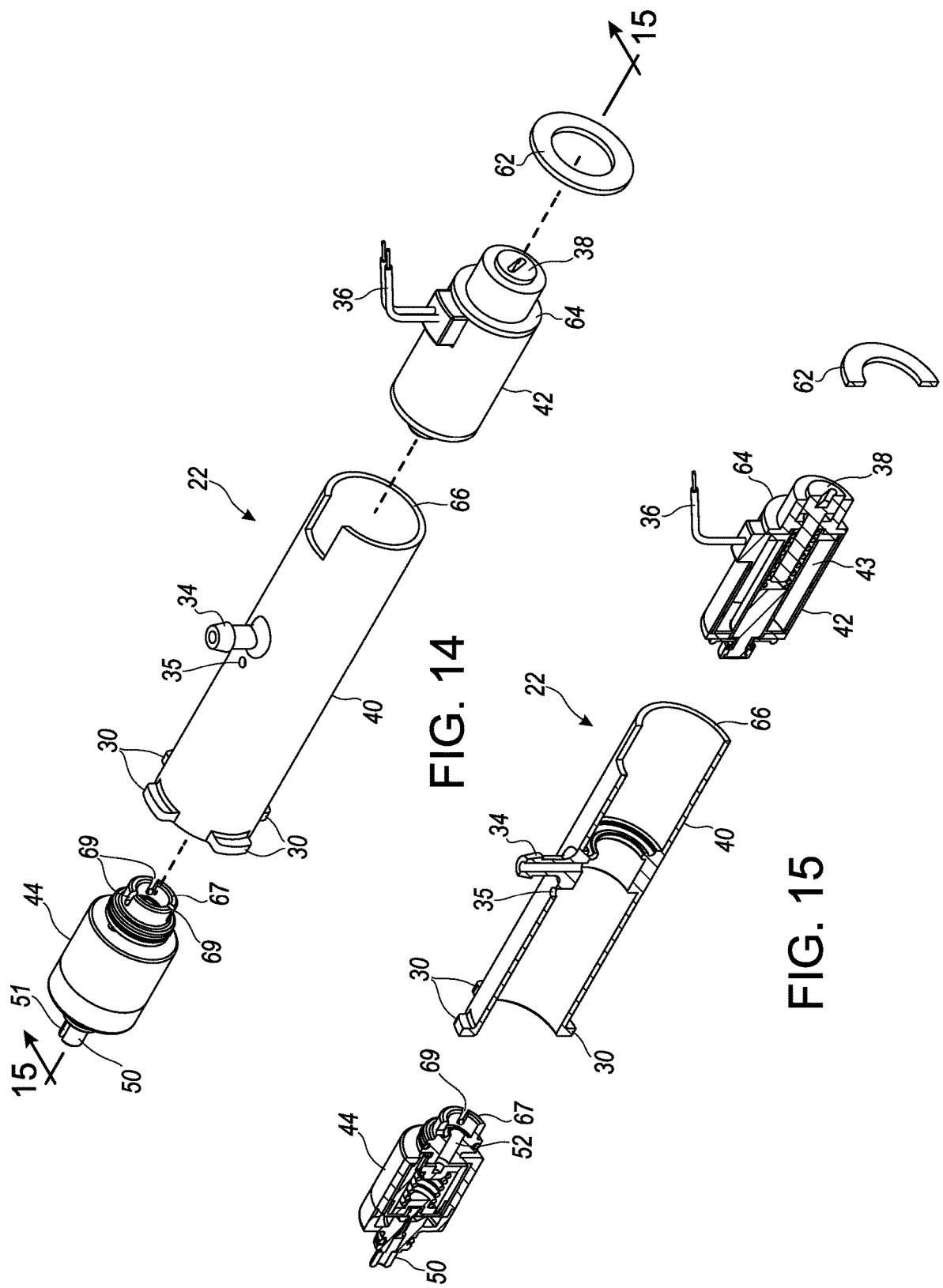

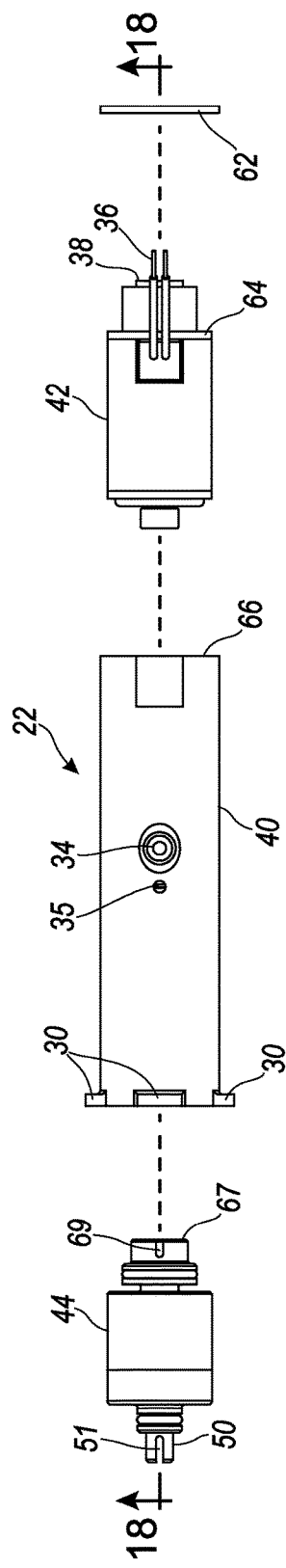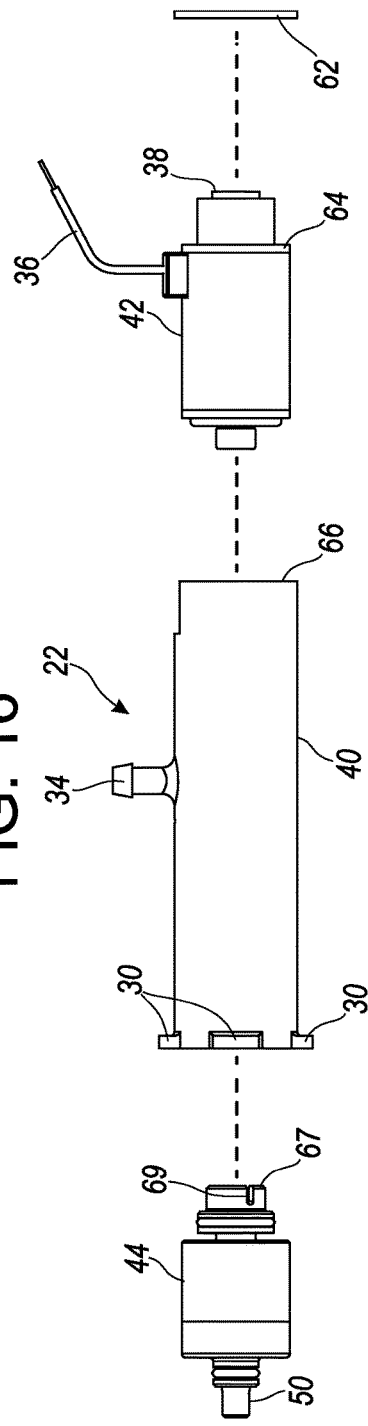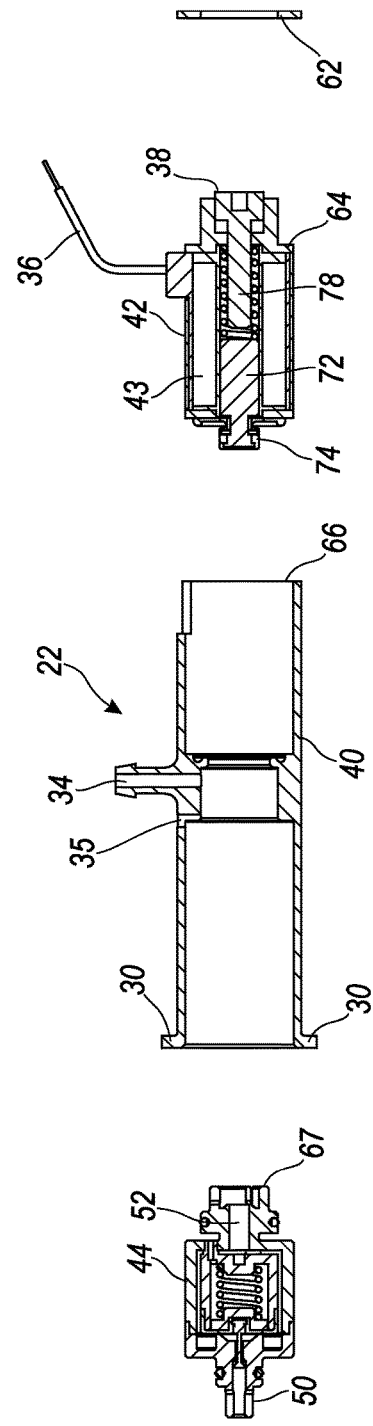
FIG. 16
FIG. 17
FIG. 18

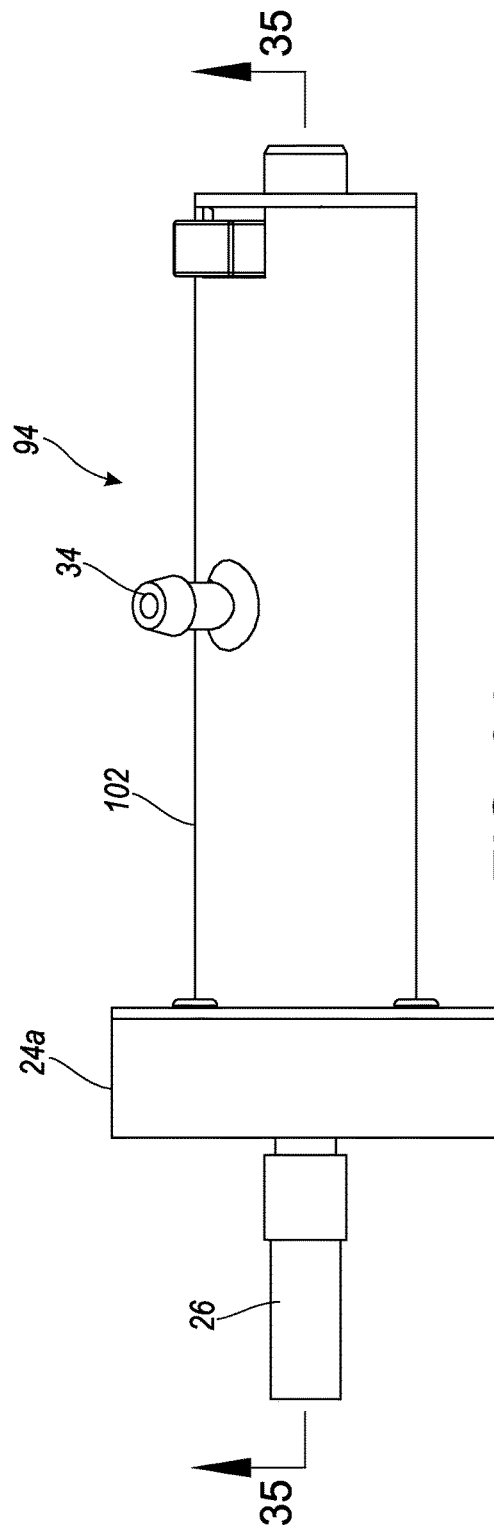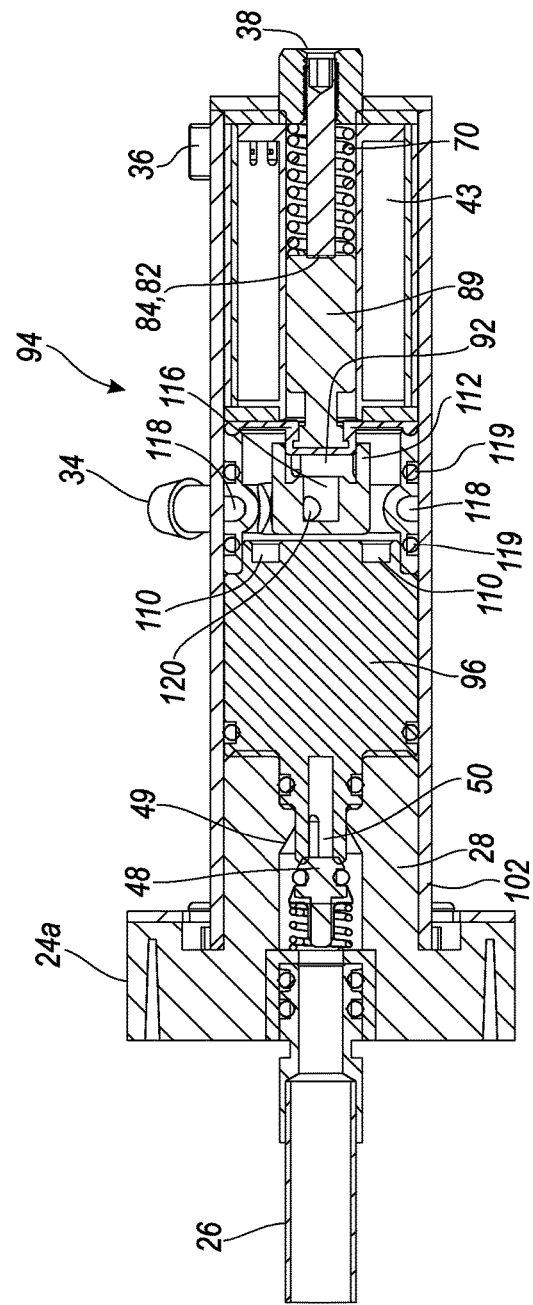

CARTRIDGE VALVE AND SYSTEM

CROSS-REFERENCE TO RELATED APPLICATION AND PRIORITY INFORMATION

This application claims the benefit of prior filed U.S. provisional application No. 63/069,572, entitled "Cartridge Valve and System", filed Aug. 24, 2020.

TECHNICAL FIELD OF THE INVENTION

This invention relates generally to flow control, and in particular to a cartridge valve and related dispensing system.

BACKGROUND OF THE INVENTION

Many systems require fluid flow control. Some of those systems require only on-and-off flow control. Others require control of the flow rate of one or more fluids. In some of these systems, such as, without limitation, beverage dispensing systems, space constraints are significant, and bear on the ease with which the flow control elements can be calibrated or replaced.

SUMMARY OF THE INVENTION

In accordance with the teachings of the present invention, a cartridge valve and dispensing system are provided which eliminate or substantially reduce problems associated with prior art systems.

In particular, a valve is provided that includes a fluid inlet, a fluid outlet, a regulator coupled to the fluid inlet and having a regulator outlet, and a solenoid, the solenoid including an armature configured to retract a retraction distance from a closed position to a retracted position, the armature adapted to stop fluid flow between the regulator outlet and the fluid outlet in the closed position, and an adjustable stop configured to adjustably set the retraction distance. The adjustable stop may be an adjustment screw, including a shaft with an armature end that restricts retraction of the armature beyond the retracted position.

In a particular embodiment, the valve includes a flow ring surrounding the regulator outlet, the flow ring including at least one slot in fluid communication with the regulator outlet and the fluid outlet, the fluid outlet being outside the flow ring, and wherein increasing the retraction distance exposes a larger part of the at least one slot. In some embodiments, the valve further includes a diaphragm coupled to a regulator end of the armature, the diaphragm including a first section adapted to close the regulator outlet in the closed position, and a second section having an outside diameter equal to or greater than an inside diameter of the flow ring.

In another particular embodiment, the valve includes a flow ring surrounding a ring outlet, the ring outlet in fluid communication with the fluid outlet, the flow ring including at least one slot in fluid communication with the regulator outlet, the regulator outlet being outside the flow ring, and wherein increasing the retraction distance exposes a larger part of the at least one slot. In some embodiments, the valve further includes a diaphragm coupled to a regulator end of the armature, the diaphragm including a first section adapted to close the ring outlet in the closed position, and a second section having an outside diameter equal to or greater than an inside diameter of the flow ring.

The valve may include a diaphragm coupled to a regulator end of the armature, the diaphragm adapted to isolate the armature from fluid flowing from the regulator outlet. In some embodiments, the diaphragm includes a first section adapted to close fluid communication between the regulator outlet and the fluid outlet in the closed position, and a second section adapted to isolate the armature from fluid flowing from the regulator outlet.

In another particular embodiment, the valve includes a fluid passageway from the regulator outlet to the fluid outlet, wherein the fluid passageway is closed by the armature in the closed position, and wherein increasing the retraction distance increases fluid flow through the fluid passageway.

The valve may also include tabs extending from it, adapted to couple with a backblock in a bayonet fitting arrangement.

In particular embodiments, the regulator and solenoid are arranged in a substantially linear arrangement, and housed axially in a substantially cylindrical housing. In some embodiments, the regulator and solenoid are arranged substantially linearly. In some other embodiments, the fluid outlet is positioned between the regulator and the solenoid.

In a particular application, the valves may be used in a post-mix beverage system.

Important technical advantages are provided by the present invention. In particular, and without limitation, the combination of a regulator and adjustable stroke solenoid allows for stable flow control, and allows for a smaller solenoid size which reduces costs and size, and accommodates greater service space. Furthermore, the bayonet fitting allows for quick and easy installation and replacement of the valves. Also, the reciprocating motion of an armature and solenoid diaphragm in a flow ring cleans clogged particulate and some pulps, thereby rendering the valve of the present invention suitable both for, without limitation, relatively consistent fluids and those with varying amounts and sizes of particulate matter or pulp.

BRIEF DESCRIPTION OF THE DRAWINGS

Reference is made in the description to the following briefly described drawings, which are not drawn to scale, and in which like reference numerals indicate like features:

FIG. 14 illustrates an exploded isometric view of one embodiment of a cartridge valve;

FIG. 15 illustrates an exploded isometric sectional view of one embodiment of a cartridge valve;

FIGS. 16-18 illustrate, respectively, top, side, and sectional exploded views of one embodiment of a cartridge valve;

FIGS. 34 and 35 illustrate, respectively, angled top and sectional views of one embodiment of an installed cartridge valve and backblock with the solenoid in its retracted position;

DETAILED DESCRIPTION OF THE INVENTION

Figure 1:
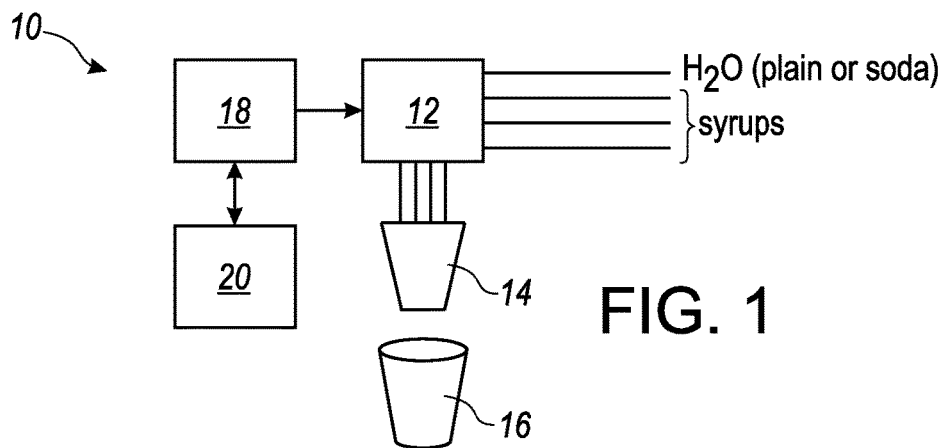
FIG. 1 illustrates a block diagram of one embodiment of a dispenser according to certain aspects of the present invention.

FIG. 1 illustrates one embodiment of a dispenser 10 according to certain aspects of the present invention. In the example embodiment of FIG. 1, dispenser 10 is a beverage dispenser; however, the present invention is not limited to beverage dispensers, and may be employed with virtually any dispenser or system that uses flow control.

Beverage dispenser 10 includes one or more valve modules 12, each associated with one or more beverages. Each valve module 12 includes one or more cartridge valves, to be described in detail below. A valve module may contain a single cartridge valve (for example, for dispensing water, soda, or some other beverage or beverage component), or a plurality of such valves, for dispensing two or more fluids. In a particular embodiment, beverage dispenser 10 may be a post-mix dispenser, in which at least one beverage base (such as, without limitation, a syrup or other concentrate) is mixed with at least one diluent, such as plain or soda water, to form a finished drink. In such a case, activating a valve module 12 to dispense a beverage opens at least one diluent valve and at least one beverage-base valve, to which the respective diluent and beverage base are coupled. Also, a beverage may be formed by mixing more than one beverage base with more than one diluent. For example, a cherry cola may be formed by mixing soda with a cola syrup and a cherry syrup (by opening three cartridge valves); similarly, root-beer cola may be formed by mixing soda with a root-beer base and a cola base (also by opening three cartridge valves).

When opened, the selected valves allow the fluids to flow through nozzle 14 into a container 16 (such as, without limitation, a cup). A controller 18 controls the valves within valve module 12 to allow dispense of a selected beverage. Controller 18 is also coupled to a user interface 20 by which a user makes a beverage selection, which may be any suitable user interface, including, without limitation, a push button, a lever, a voice recognition system, a gesture recognition system, a touch screen, a smart phone, a proximity sensor system, or any combination thereof. A valve module 12 may be dedicated to a particular beverage (for example cola), or a valve module 12 may include more than two valves to accommodate dispensing of multiple beverages in a post-mix dispenser.

Figure 2:
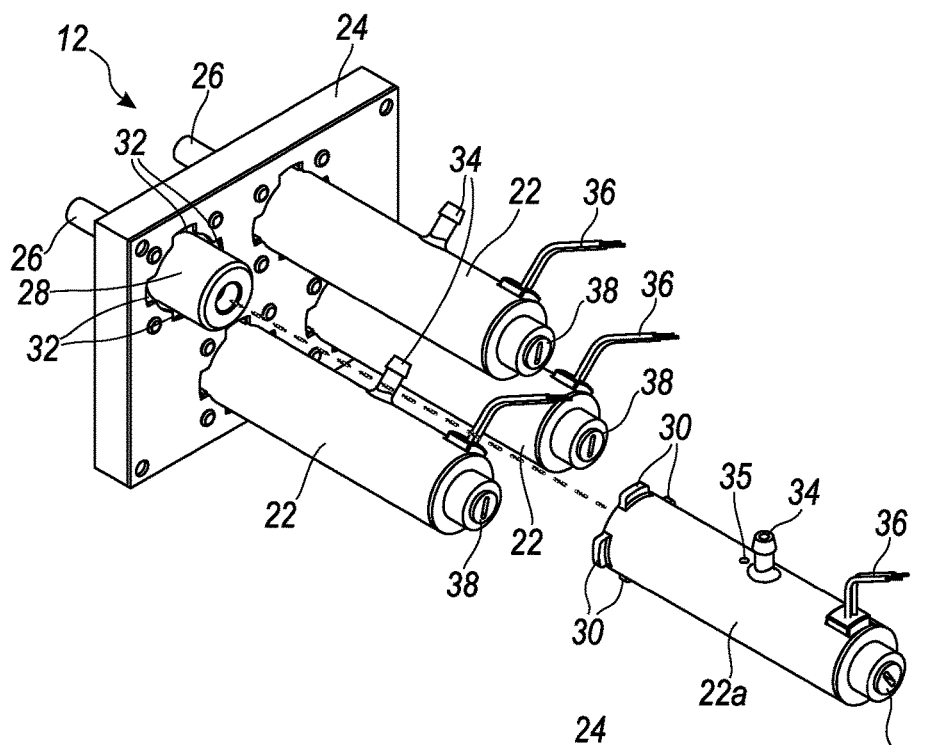
FIGS. 2 and 3 illustrate one embodiment of an array of cartridge valves and backblock, showing one installation approach.
Figure 3:
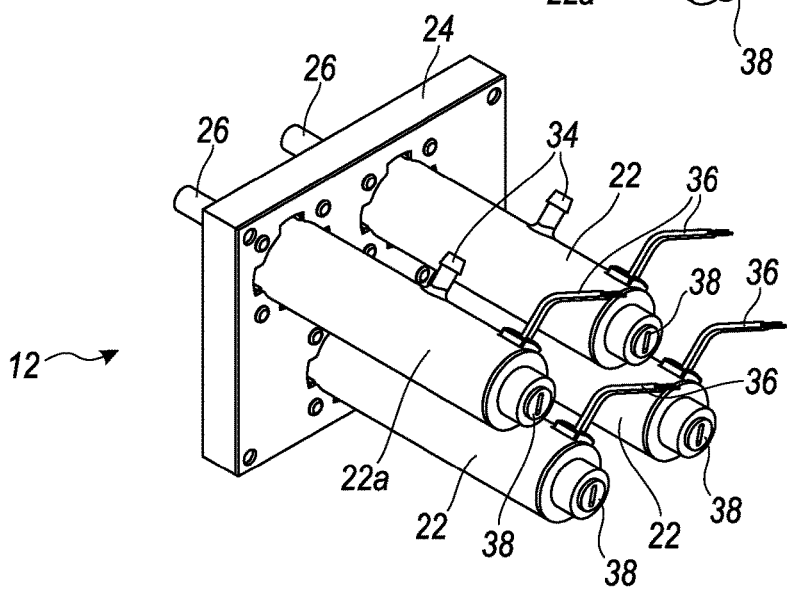

FIGS. 2 and 3 illustrate one embodiment of an array of four cartridge valves 22, and one approach for installing and uninstalling the valves. The use of four cartridge valves is for example only, and fewer or more than four such valves may be used. In FIG. 2, three cartridge valves 22 are installed in backblock 24, and one (22a) is not yet installed. In FIG. 3, valve 22a is installed in backblock 24. Backblock 24 is mounted to the dispenser 10, and provides a connection point for the cartridge valves 22 and their respective fluids, which are supplied through conduits 26. Backblock 24 includes a plurality of shut-off valves 28 (one is shown in FIG. 2), one each of which is coupled to an installed cartridge valve 22. Each shut-off valve 28 stops the flow of fluid from its respective supply conduit 26 when its respective cartridge valve 22 is not installed. Each shut-off valve 28 is opened, to allow fluid flow into its respective cartridge valve 22, when its respective cartridge valve 22 is installed.

In the particular example shown, examples of one embodiment of a cartridge valve 22 are installed and uninstalled in backblock 24 by use of a bayonet fitting. Coupling with a bayonet fitting is advantageous because it allows easy engagement and disengagement of the cartridge valves 22, thus facilitating more efficient maintenance. However, any suitable connection may be used. The bayonet fitting is accomplished with tabs 30 that extend from near the backblock-end of each cartridge valve 22. Tabs 30 pass through openings 32 into a hollow space in backblock 24, and, upon rotation of the cartridge valve 22, form an interference fit with the backblock 24. As shown in FIG. 2, uninstalled valve 22a is oriented approximately 45° from the installed valves 22. Upon insertion of the tabs 30, the valve is rotated approximately 45° to complete installation. This process is reversed to uninstall a valve 22.

A fluid outlet 34 extends from each cartridge valve 22. When a valve 22 is activated, its respective fluid flows through its respective fluid outlet 34 to nozzle 14. Also shown is an air vent outlet port 35. Each valve 22 includes an electrical connection 36, which is coupled to controller 18 for activation of the respective valve 22. Each valve 22 also includes an adjustment screw 38 for use in calibrating the valve, to be described in detail below.

Figure 4:
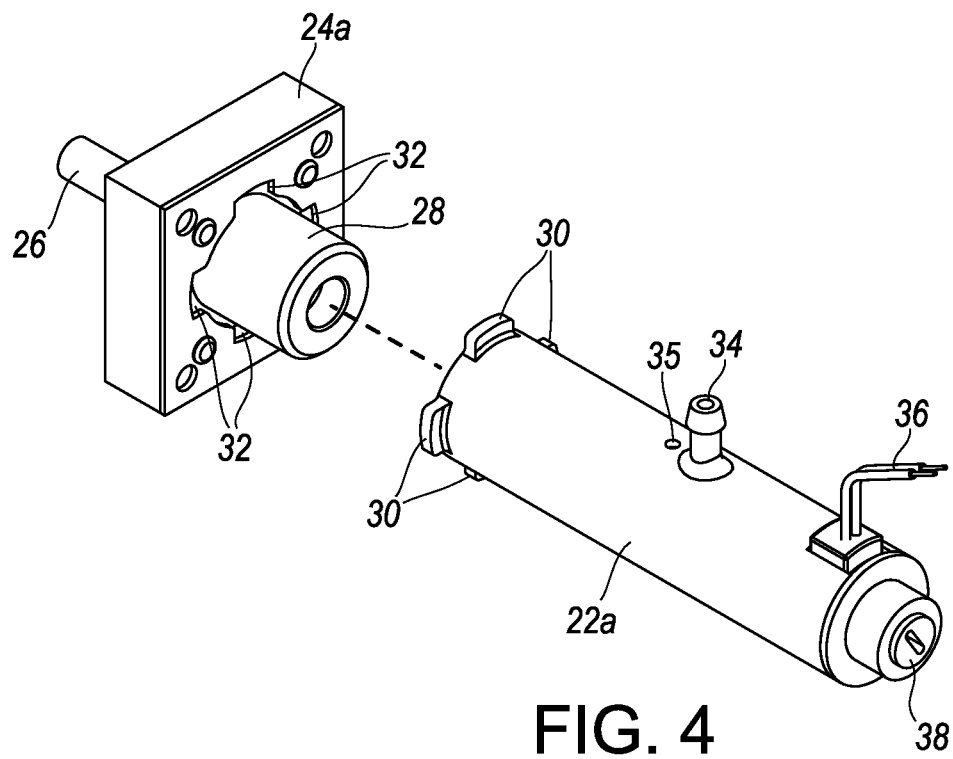
FIGS. 4 and 5 illustrate different views of one embodiment of an uninstalled cartridge valve and backblock.
Figure 5:
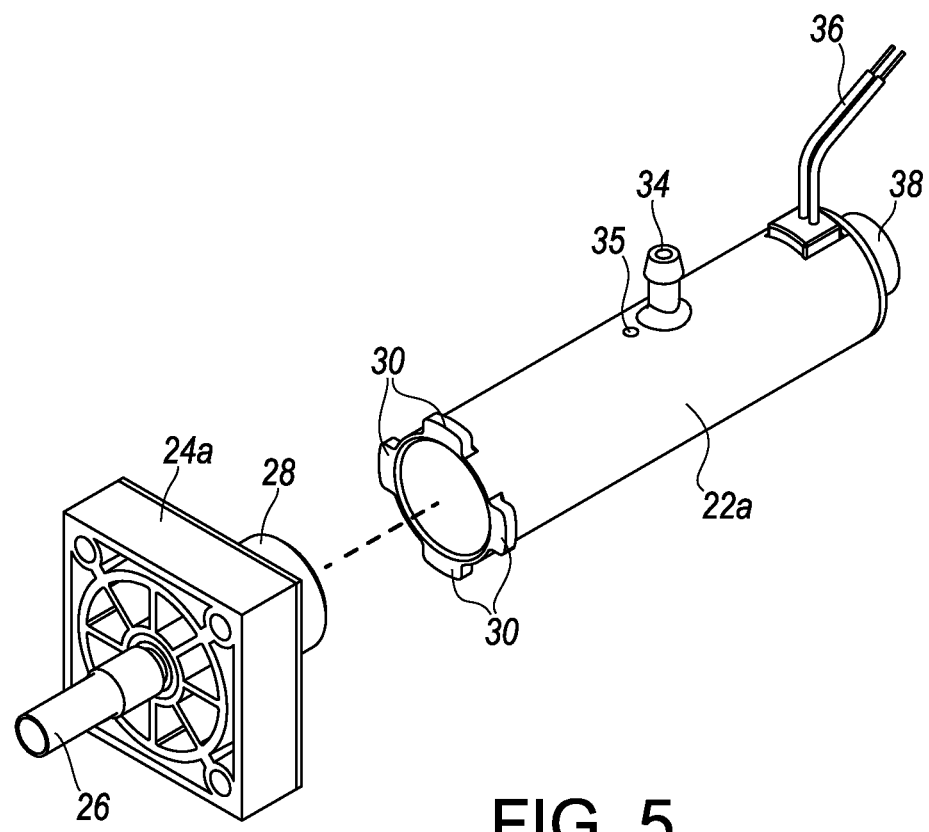
Figure 6:
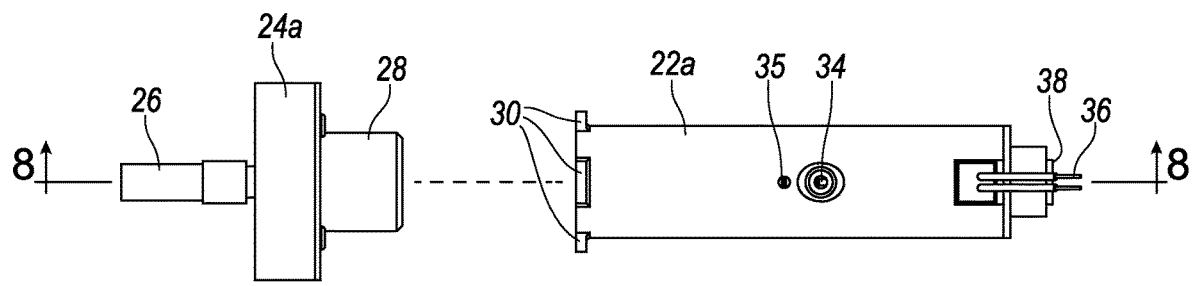
FIGS. 6 and 7 illustrate, respectively, top and side views of one embodiment of an uninstalled cartridge valve and backblock.
Figure 7:
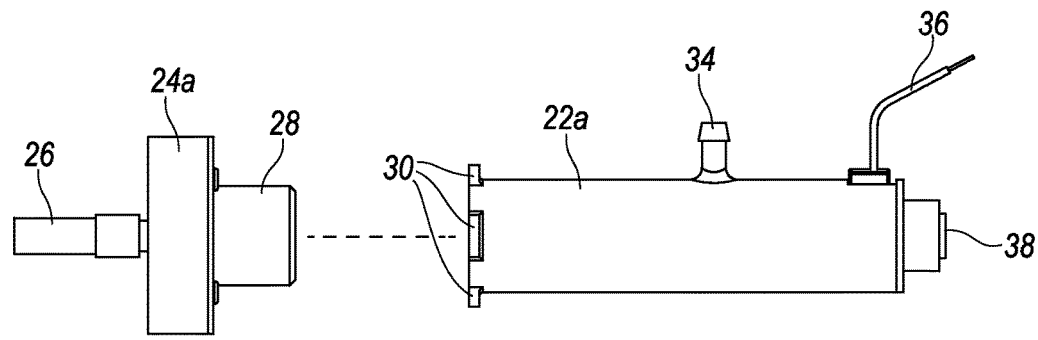

FIGS. 4 and 5 show front and rear isometric views, and FIGS. 6 and 7 show top and side views, of an uninstalled valve 22 and backblock 24a. Backblock 24a is shown as a discrete backblock, accommodating one cartridge valve 22. However, backblock 24a may be a part of a larger backblock 24 such as shown in FIGS. 1 and 2.

Figure 8:
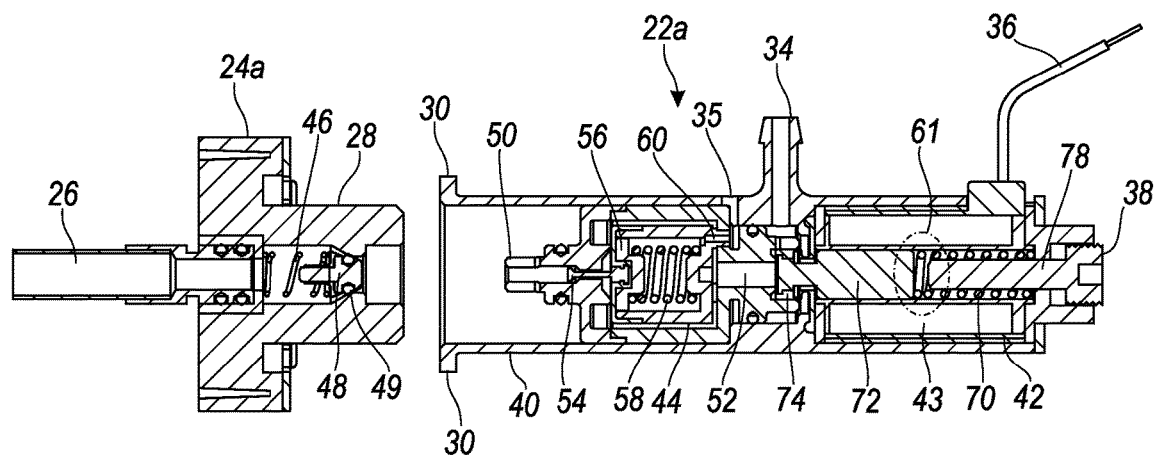
FIG. 8 illustrates an enlarged sectional view of one embodiment of an uninstalled cartridge valve and backblock.
Figure 9:
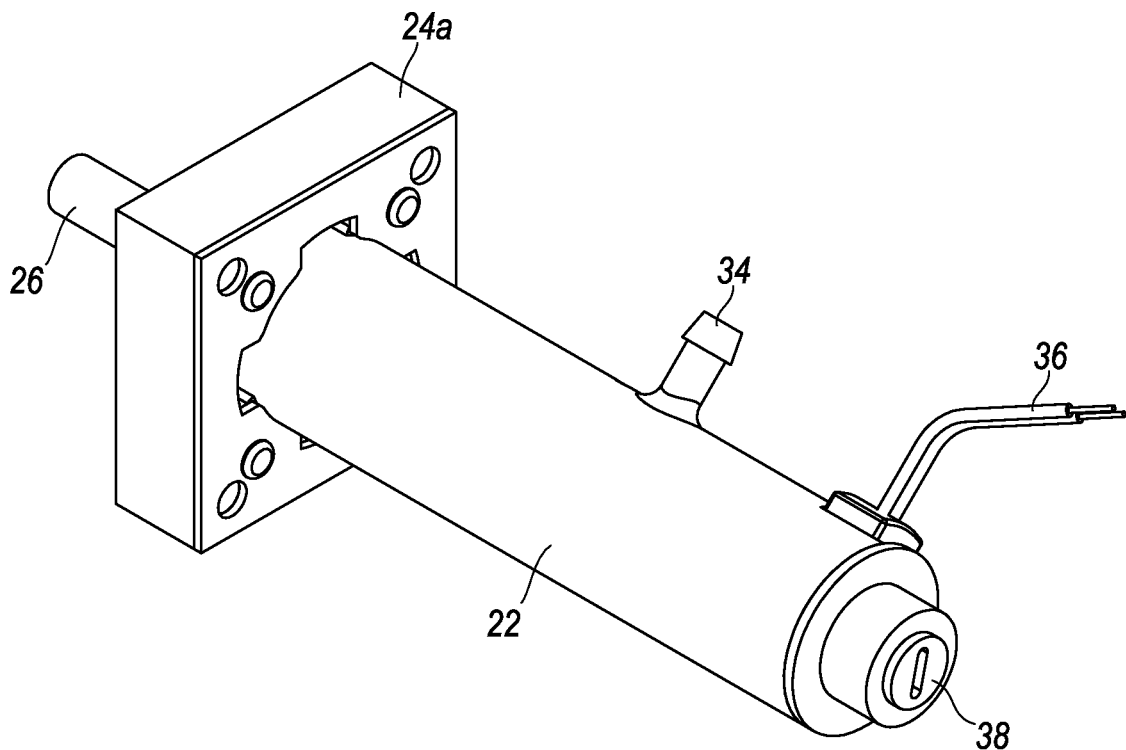
FIG. 9 illustrates an isometric view of one embodiment of an installed cartridge valve and backblock.
Figure 10:
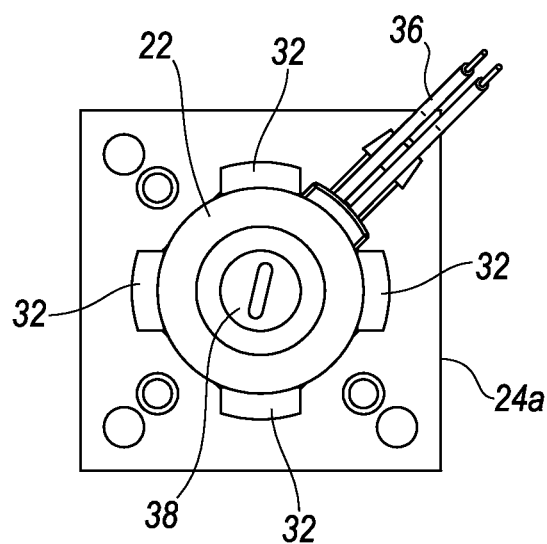
FIG. 10 illustrates a front view of one embodiment of an installed cartridge valve and backblock.
Figure 11:
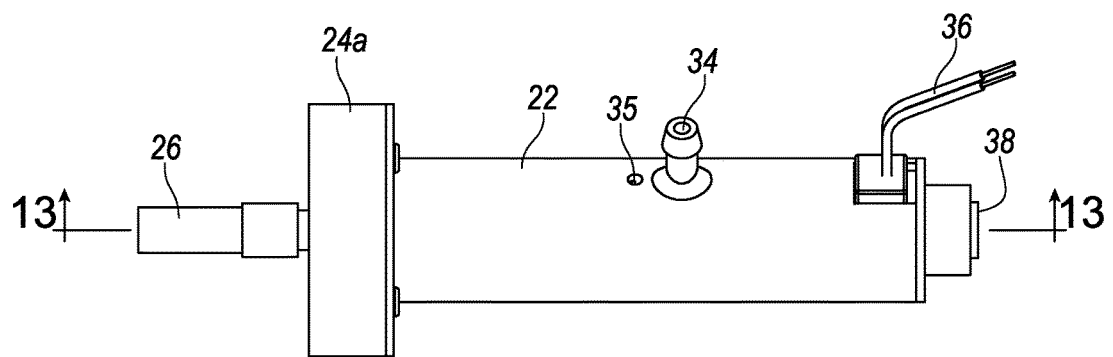
FIGS. 11 and 12 illustrate angled side views of one embodiment of an installed cartridge valve and backblock.
Figure 12:
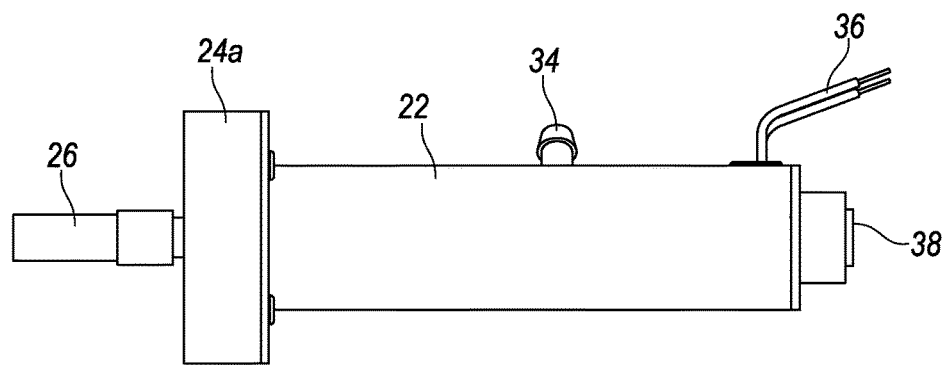

FIG. 8 is an enlarged sectional side view taken along the sight line shown in FIG. 6. As shown, valve 22 includes a housing 40, an adjustable stroke solenoid 42 (to be discussed in connection with FIGS. 19-27), and a regulator 44. An example of shut-off valve 28 is also shown, which includes a biasing spring 46 that pushes sealing pin 48 onto an outlet seat 49 to close the shut-off valve 28 when cartridge valve 22 is not installed. When cartridge valve 22 is installed (as in FIG. 13), regulator inlet 50, which extends from regulator 44, is inserted into shut-off valve 28 and overcomes the spring 46 to unseat sealing pin 48 and open shut-off valve 28. Fluid can then flow from supply conduit 26, through shut-off valve 28, through slots 51 (best seen in FIGS. 14 and 16) of regulator inlet 50, and into regulator 44 of cartridge valve 22.

Regulator 44 may be any suitable regulator, but in a particular example includes a CFValve™ made by Gate, LLC. Regulator 44 includes a regulator outlet 52. Regulator 44 provides a substantially constant output pressure, which, as will be discussed below, will facilitate providing a substantially constant outlet flow rate. Inlet pressures often have substantial variances (due to many factors), which affects flow rates and therefore reduce the accuracy or quality of the system. For example, with a post-mix beverage dispenser, inlet pressure variances, if not regulated, affect the ratio of diluent to concentrate, thus reducing the quality of the finished beverage.

The illustrated example of regulator 44 also includes a metering pin 54, a regulator diaphragm 56, a regulator spring 58, and an air vent 60 (air vent 60 vents through outlet port 35 in housing 40). If inlet pressure is too low (below a threshold pressure), the regulator spring 58 will urge the regulator diaphragm 56 against a sealing ring 59 to close the regulator 44. As the inlet pressure reaches and exceeds the threshold pressure, the regulator spring 58 is proportionally overcome and regulator diaphragm 56 retracts from sealing ring 59 so that fluid can flow around the metering pin 54 and into the regulator 44, and eventually out the regulator outlet 52 when the cartridge valve 22 is open. However, as the inlet pressure increases and the regulator diaphragm 56 retracts farther from the sealing ring 59, the metering pin 54 (which is connected to and moves with the regulator diaphragm 56) throttles the fluid flow through the regulator 44 by reducing input orifice area, thereby controlling the fluid flow. Likewise, as the inlet pressure decreases (but if still above the threshold pressure), the regulator diaphragm 56 and metering pin 54 move upstream toward the sealing ring, due to the spring 58, to increase the input orifice area. The metering pin 54 may employ a tapered head to modulate the input orifice area as it moves in and out in response to varying inlet pressure.

The adjustable stroke solenoid 42, to be discussed in detail below, is shown in FIG. 8 in its resting (un-activated) position, in which the cartridge valve 22 is closed. This closed state is brought about by solenoid spring 70, which urges armature 72 toward, and its covering solenoid diaphragm 74 against, regulator outlet 52, with solenoid diaphragm 74 sealing off the regulator outlet 52. In this position, a gap 61 exists between the adjustment screw 38 and the armature 72.

Figure 13:
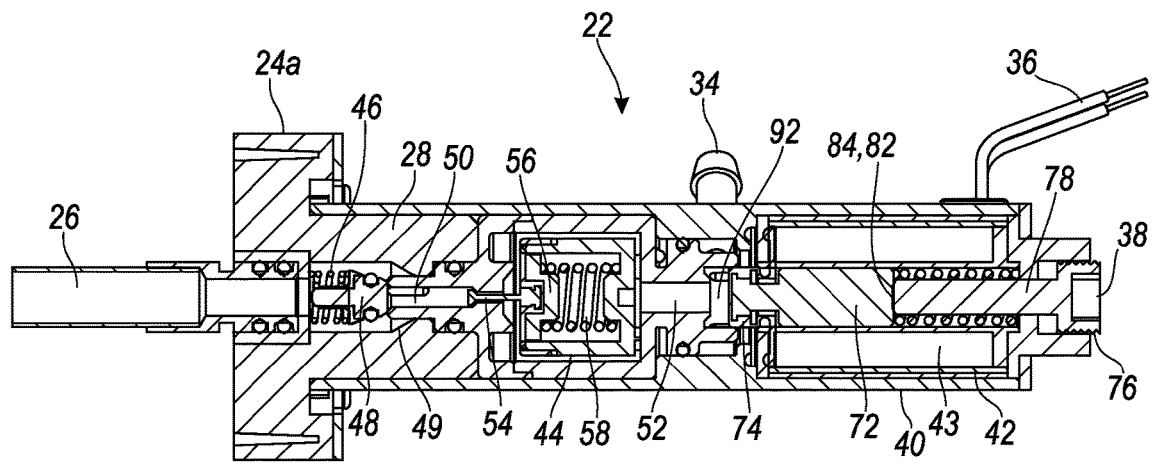
FIG. 13 illustrates an enlarged sectional view of one embodiment of an installed cartridge valve and backblock.
Figure 19:
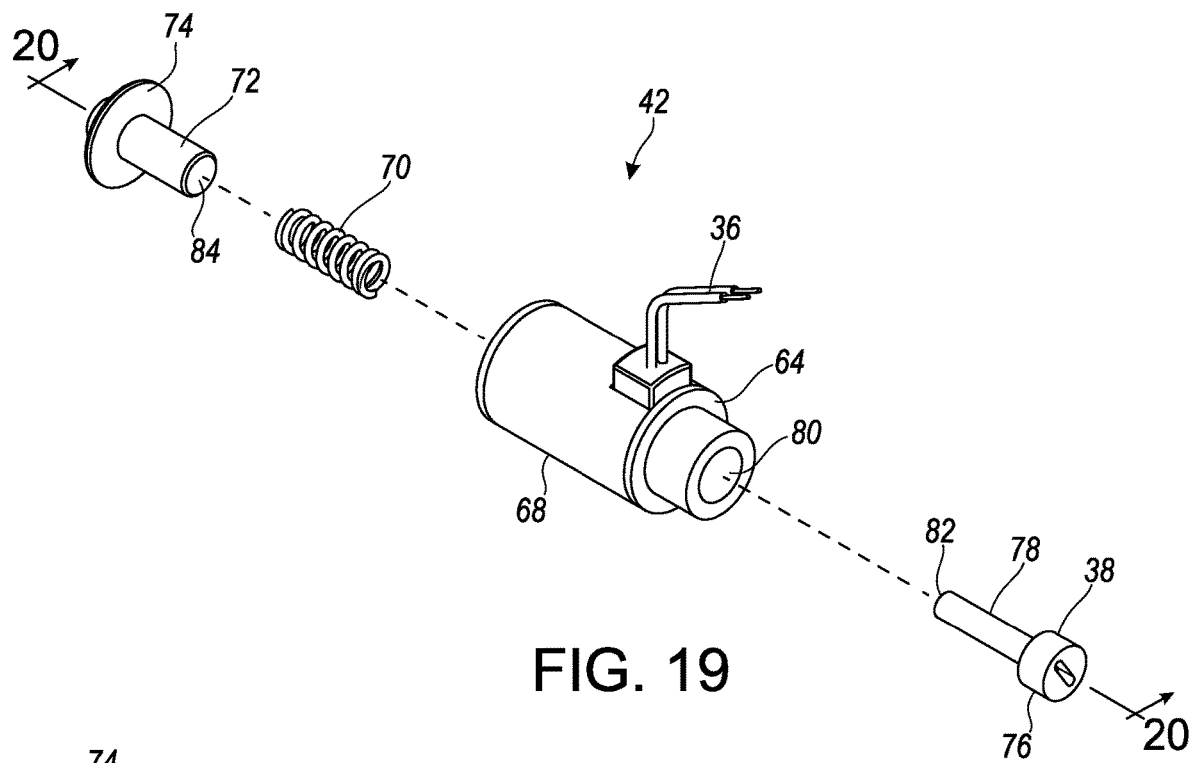
FIG. 19 illustrates an exploded isometric view of one embodiment of an adjustable stroke solenoid.
Figure 20:
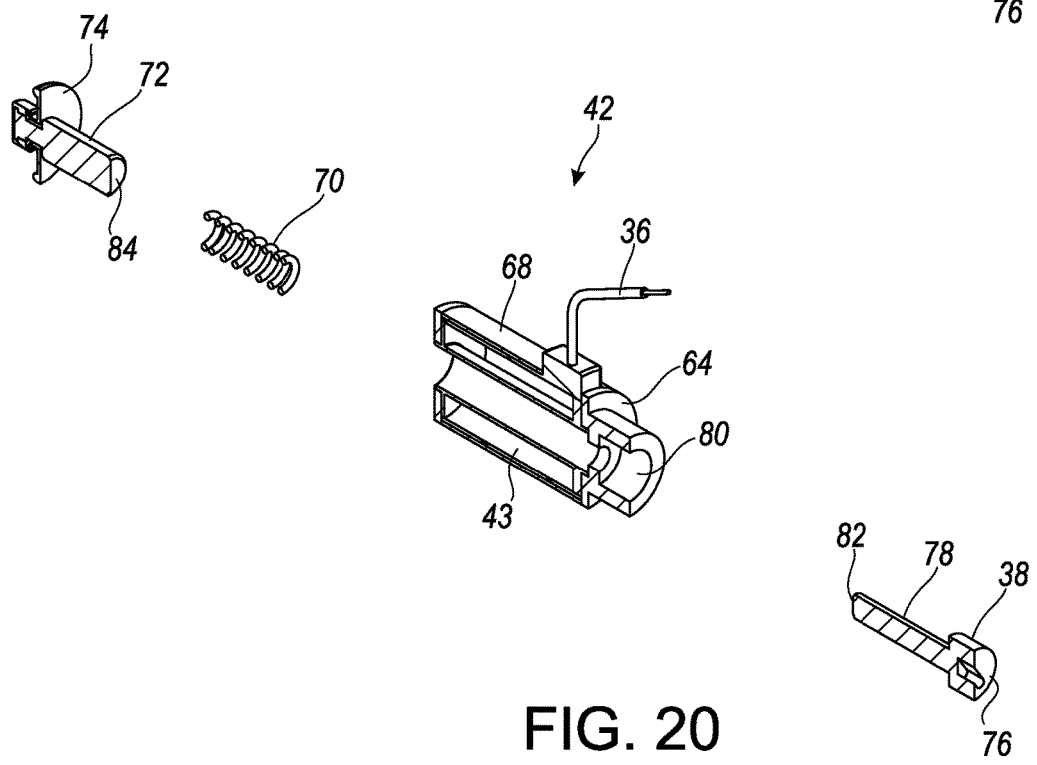
FIG. 20 illustrates an exploded isometric sectional view of one embodiment of an adjustable stroke solenoid.
Figure 21:
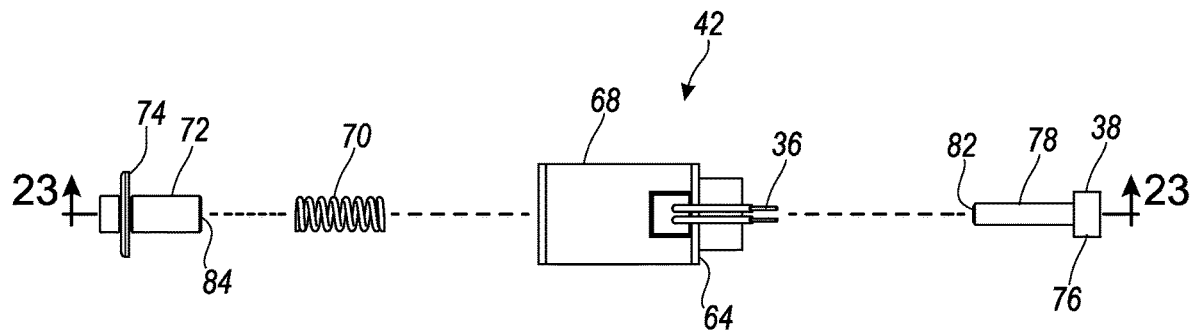
FIGS. 21-23 illustrate, respectively, top, side, and sectional exploded views of one embodiment of an adjustable stroke solenoid.
Figure 22:
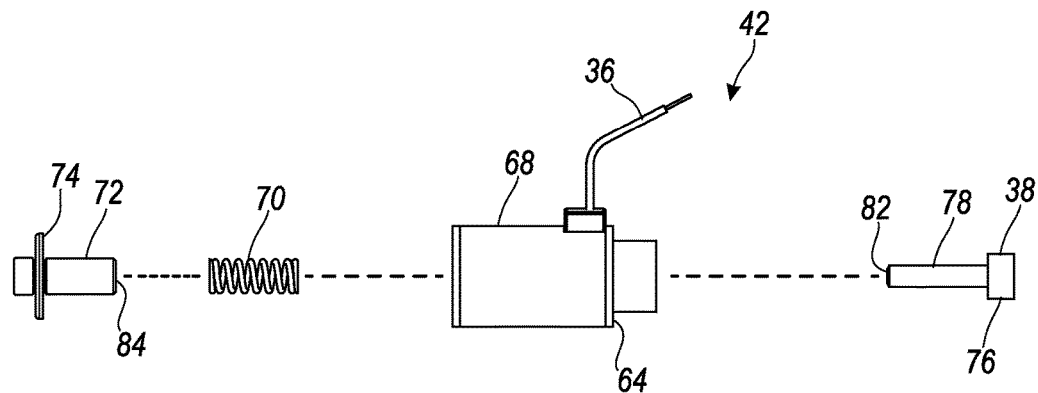
Figure 23:
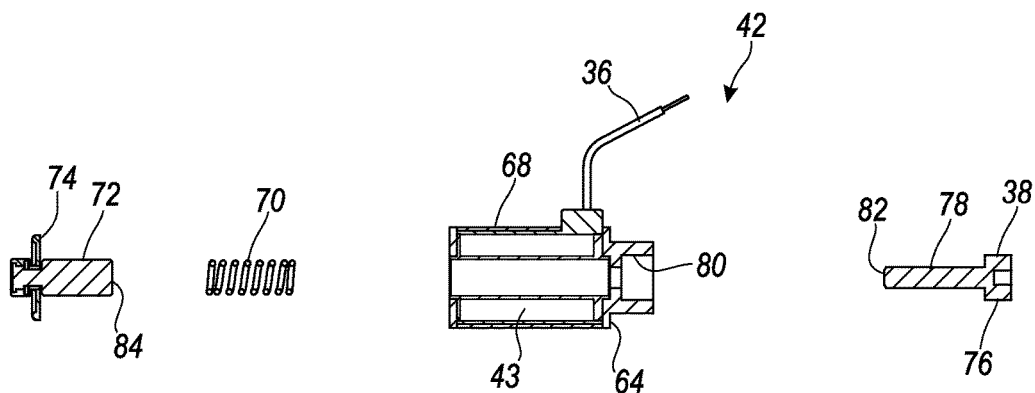
Figure 24:
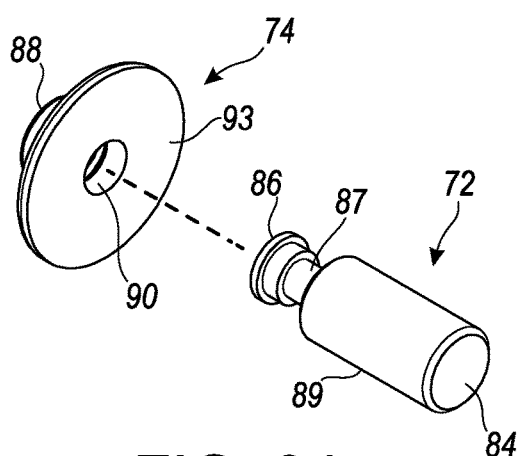
FIGS. 24 and 25 illustrate isometric views of one embodiment of an armature and solenoid diaphragm.
Figure 25:
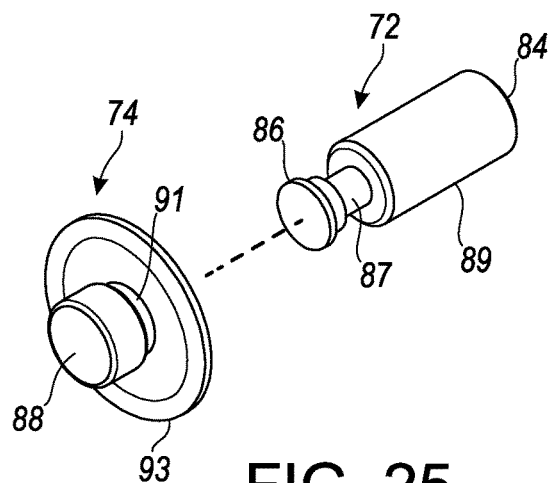
Figure 26:
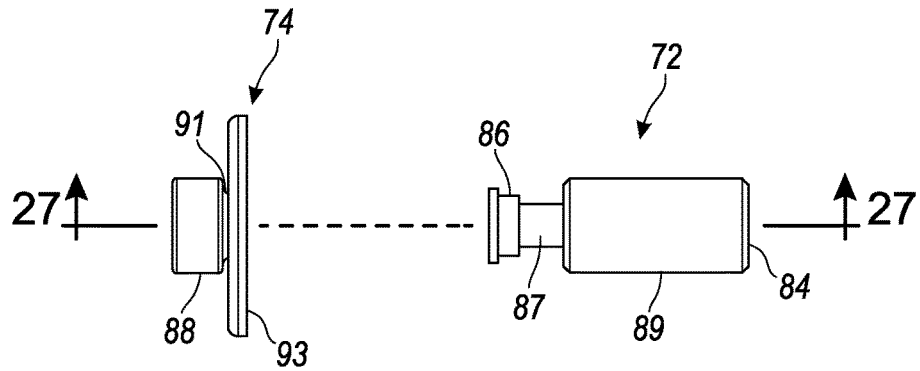
FIG. 26 illustrates a side view of one embodiment of an armature and solenoid diaphragm.
Figure 27:
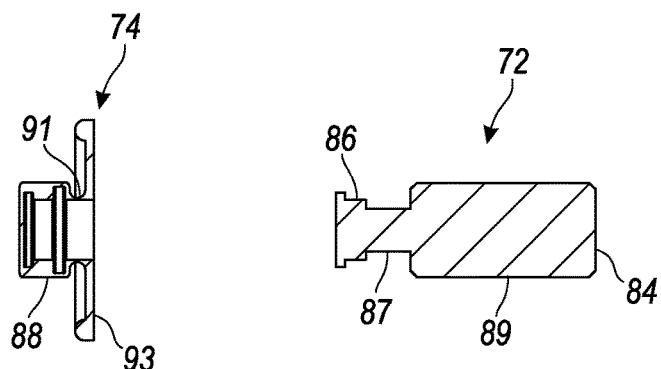
FIG. 27 illustrates a sectional side view of one embodiment of an armature and solenoid diaphragm.
Figure 28:
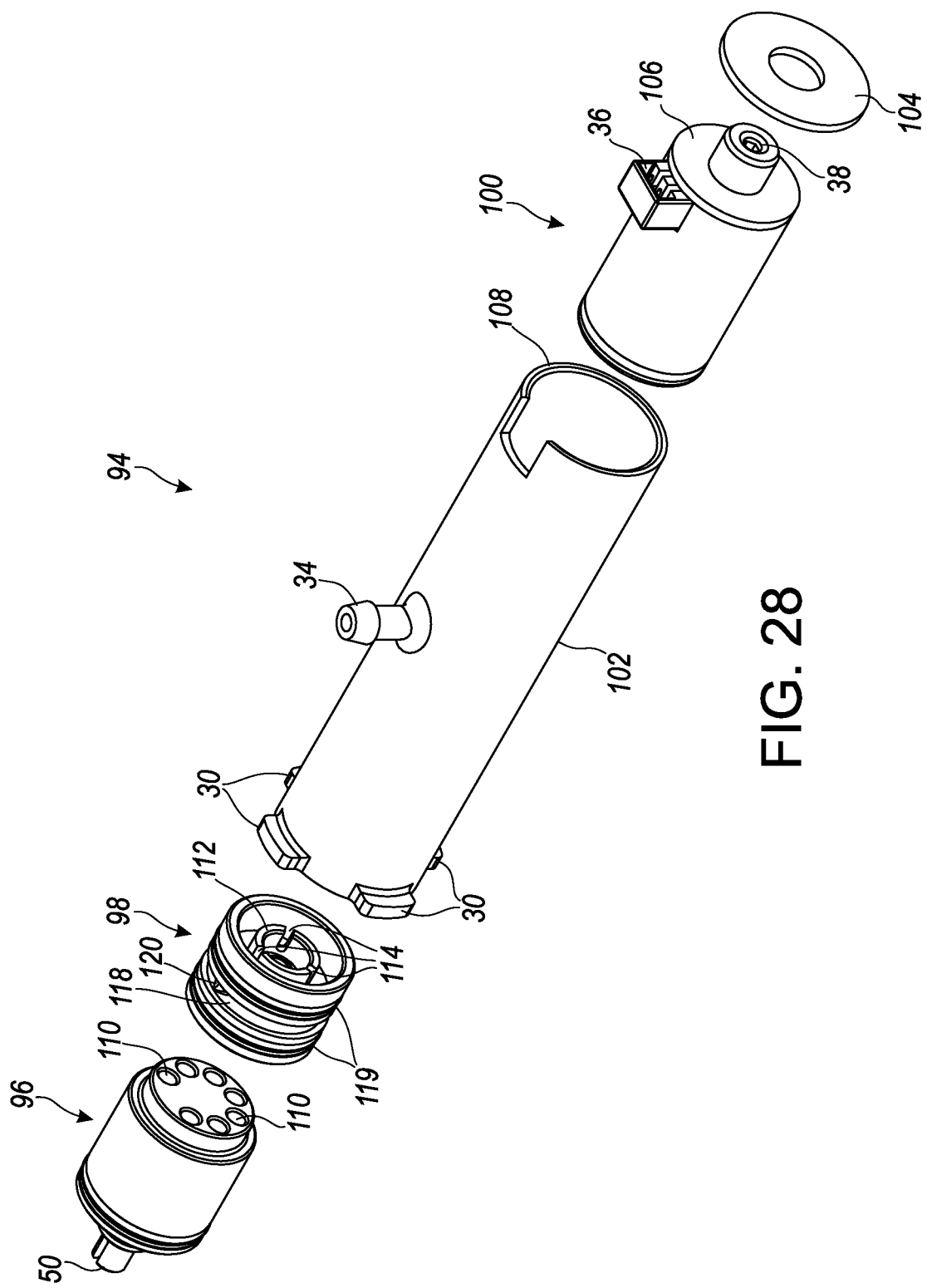
FIGS. 28 and 29 illustrate, respectively, exploded isometric and top views of one embodiment of a cartridge valve.
Figure 29:
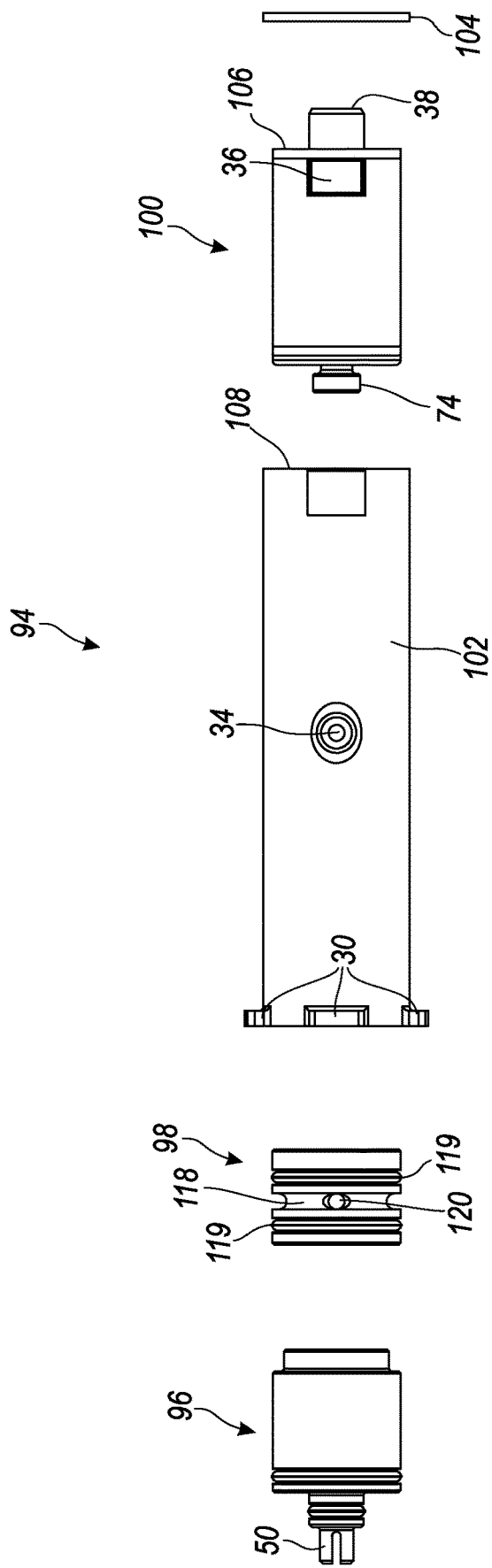

FIGS. 9-13 show various views of the example cartridge valve 22 installed in backblock 24a. As can be seen in enlarged sectional view FIG. 13, regulator inlet 50 in engaged with shut-off valve 28 and, when so engaged, compresses spring 46 to open the shut-off valve 28. As also shown in FIG. 13, the adjustable stroke solenoid 42, to be discussed in detail below, is shown in its activated position, in which the cartridge valve 22 is open. This open state is brought about by activating the solenoid coil (windings) 43 via electrical connection 36, which retracts armature 72 and its covering solenoid diaphragm 74 from the regulator outlet 52, to allow fluid flow from regulator outlet 52 to fluid outlet 34. In this position, a gap 92 exists between regulator outlet 52 and the solenoid diaphragm 74, and no gap 61 is present (armature 72's end 84 is stopped against adjustment screw 38's end 82). Adjustment screw 38 is an adjustable stop. Other mechanisms may be employed to accomplish the stop.

FIGS. 14-18 show exploded views of the example cartridge valve 22. Housing 40 houses (at least partially) adjustable stroke solenoid 42 and regulator 44. The overall arrangement is substantially cylindrical. In the particular example shown, fluid outlet 34 extends from housing 40 between the solenoid 42 and regulator 44; however, other arrangements can be used. A sealing cap 62 may be welded or glued to flange 64 of solenoid 42 and end 66 of housing 40 to seal the valve 22 and fix the solenoid 42 in place.

As shown in FIGS. 14-18, the regulator outlet 52 is surrounded by an outlet flow ring 67 which includes slots 69. The solenoid diaphragm 74 moves within the outlet flow ring 67 to alternately seal off regulator outlet 52 when valve 22 is closed, or to retract from the regulator outlet 52 and create gap 92. The outside diameter of solenoid diaphragm 74 (at its receptacle 88, see, e.g., FIG. 25) is equal to or slightly larger than the inside diameter of outlet flow ring 67, so that fluid exits through the slots 69. As the diaphragm retracts from regulator outlet 52, the gap 92 increases, exposing a larger part (greater cross-sectional area) of the slots 69 for increased flow from the regulator 44. With the cartridge valve 22 in the open position, fluid flows through the fluid passageway that runs from regulator outlet 52, through the gap 92 and out the slots 69 to fluid outlet 34. As a result, the exposed portions of the slots 69 are the effective outlet orifice of the regulator 44.

In the example embodiment shown, three slots 69 are provided, but fewer or more may be used, and indeed the outlet flow ring 67 (and therefore slots 69) may be omitted altogether, or changed in shape. For example, and without limitation, it may be desirable to omit flow ring 67 or to use more or larger slots 69 in high flow-rate applications, for example and without limitation, in applications when dispensing plain or soda water at high rates is desired.

FIGS. 19-23 illustrate various views and elements of adjustable stroke solenoid 42. Adjustable stroke solenoid 42 includes adjustment screw 38, solenoid body 68 (which includes the coil 43 connected to electrical connection 36), solenoid spring 70, armature 72, and solenoid diaphragm 74. Adjustment screw 38 includes a head 76, shaft 78, and armature end 82. The sidewall of head 76 is threaded (or the head end of shaft 78, before it passes through spring 70), preferably finely (e.g., without limitation, approximately 50 threads per inch), and engages in matching threads on the inside of receptacle 80 of solenoid body 68 (see, e.g. FIG. 13).

FIGS. 24-27 illustrate various views of armature 72 and solenoid diaphragm 74. Armature 72 includes an armature end 84, armature head 86, and main body 89. Head 86 may be separated from the main body 89 of armature 72 by an armature neck 87, having a smaller diameter than the head 86 or main body 89. Head 86 may also be stepped in diameter. Solenoid diaphragm 74 "snaps" on to head 86 (or can otherwise be coupled to head 86). Solenoid diaphragm 74 may be made of a flexible material such as FKM rubber. When assembled, head 86 resides in diaphragm receptacle 88 of solenoid diaphragm 74 after being pressed through smaller diameter opening 90 of flexible diaphragm 74. Solenoid diaphragm 74 may include a diaphragm neck 91 having a smaller diameter than receptacle 88 and diaphragm flange 93. Armature 72 is made of magnetic metal, for example, without limitation, magnetic steel. The isolation of armature 72 from fluids, due to solenoid diaphragm 74, obviates concerns for corrosion of the armature 72, and thus allows the use highly magnetic metals for the armature 72 to achieve greater efficiency (corrosion resistant metals are often less magnetic). This greater efficiency allows for a smaller solenoid, thus reducing costs.

In operation, when the cartridge valve 22 is not activated (closed), the solenoid spring 70 urges armature 72 and solenoid diaphragm 74 toward the regulator outlet 52 of regulator 44, and diaphragm 74 seals off the regulator outlet 52 (as shown in FIG. 8). To open the cartridge valve 22, current is passed through the coil 43 through electrical connection 36, and the resulting magnetic field retracts the armature 72 (and therefore diaphragm 74 which is attached to the armature 72) from the regulator outlet 52, toward end 82 of shaft 78, creating a gap 92 (shown in FIG. 13) between solenoid diaphragm 74 and regulator outlet 52. When end 84 of armature 72 contacts end 82 of shaft 78 (as shown in FIG. 13), the retraction is stopped, and the armature 72 is in its retracted position. The size of the gap 92 (the distance the armature travels to it retracted position—also referred to as the retraction distance) determines how much area of slots 69 is exposed for fluid flow from regulator outlet 52 to fluid outlet 34, and therefore controls the outlet flow rate. That is, as gap 92 is increased, a larger part of the slots 69 is exposed for outlet flow, thus increasing the outlet flow rate. Similarly, as gap 92 is decreased, a smaller part of the slots 69 is exposed for outlet flow, thus decreasing the outlet flow rate. The size, shape, number, and location of the slots 69 can be designed as appropriate for the particular system in which the valves 22 will be used. The size of the gap 92—and therefore the outlet flow rate—is determined by the setting of adjustment screw 38; the deeper adjustment screw 38 is set, the smaller the gap 92, and vice versa. Furthermore, although a flow ring and slot structure are preferred in restricting flow from regulator outlet 52, other structures may be used.

This combination of constant pressure (from regulator 44) and gap 92 adjustment (from adjustable stroke solenoid 42) allows for very accurate control of flow rates. In particular, because of regulator 44, the outlet flow rate will not be materially affected by variations in input pressures. And by adjusting the gap 92, the outlet flow rate can be adjusted as desired, for example, to accommodate the ratio preference for the fluids being dispensed, to account for various viscosities in the fluids (for example due to temperature or product characteristics), or for faster or slower dispenses (for example, without limitation, to control foaming in carbonated fluids). Once the flow rate is set as desired (via adjustment screw 38), the flow rate will be very stable because of the constant pressure of the fluid output by regulator 44.

Also, by regulating input pressures with regulator 44, a smaller solenoid may be used, because without pressure regulation, a solenoid must be able to seal against any foreseeable input pressure, which may include relatively high pressures. Sealing against those high pressures requires a relatively strong spring, and a larger solenoid to overcome the spring when input pressures are lower. Because regulator 44 reduces these high input pressures, the present invention allows use of a smaller solenoid, thereby reducing size and cost. By reducing size, space can be better utilized, and more service space accommodated. Adequate service space is important for efficient installation, replacement, and calibration of the valves 22.

FIGS. 28-34 illustrate an alternative embodiment of a cartridge valve according to the present invention. As shown, cartridge valve 94 includes regulator 96, flow module 98, and adjustable stroke solenoid 100. A housing 102 at least partially encloses these elements. Sealing cap 104 may be welded or glued to end 106 of solenoid 100 and end 108 of housing 102 to seal the valve 94 and fix the solenoid 100 in place.

Regulator 96 operates as discussed above in connection with regulator 44, except that the regulator outlet is comprised of one or more regulator outlets 110 which are in fluid communication with the outside of flow ring 112, which is disposed within flow module 98. Flow ring 112 includes slots 114, like flow ring 67 and slots 69 discussed above. Flow ring 112 also includes a ring outlet 116 in fluid communication with outlet annulus 118 through one or more ports 120. Outlet annulus 118 is in fluid communication with fluid outlet 34, and sealed on either end with O-rings 119.

As in the first embodiment discussed above, armature 72 and solenoid diaphragm 74 move within flow ring 112 from a closed position, to an open, retracted position. However, in the embodiment of FIGS. 28-34, in the closed position, diaphragm 74 seals ring outlet 116 to close the valve (rather than regulator outlet 52). In the retracted position, some or all of slots 114 are exposed to allow fluid flow through the fluid passageway that runs from the one or more regulator outlets 110 into flow module 98, through slots 114 into flow ring 112, then through ring outlet 116, ports 120, and annulus 118 to fluid outlet 34.

Figure 30:
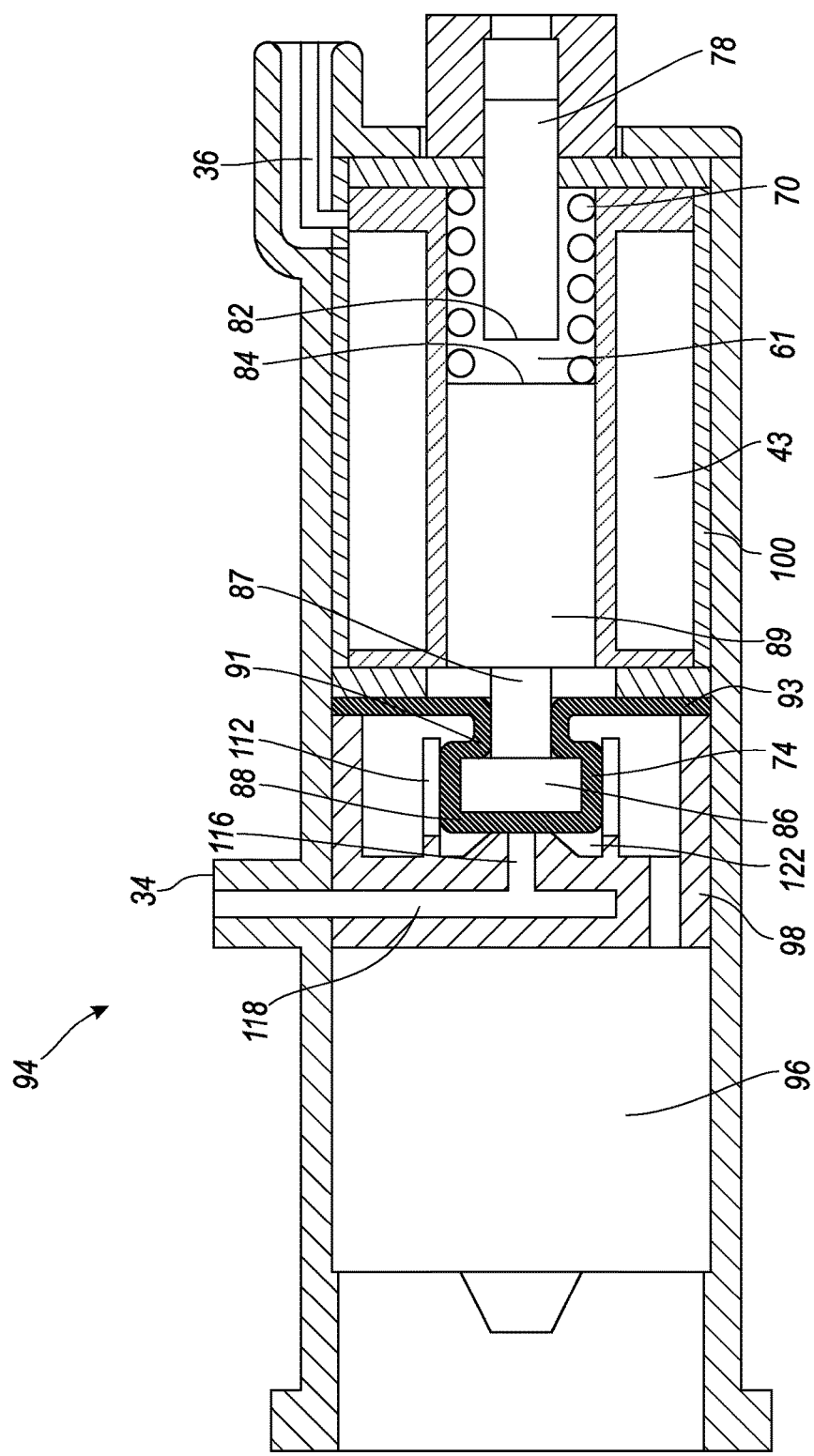
FIGS. 30 and 31 illustrate schematic representations of one embodiment of a cartridge valve with the solenoid in its respective closed and retracted positions.
Figure 31:
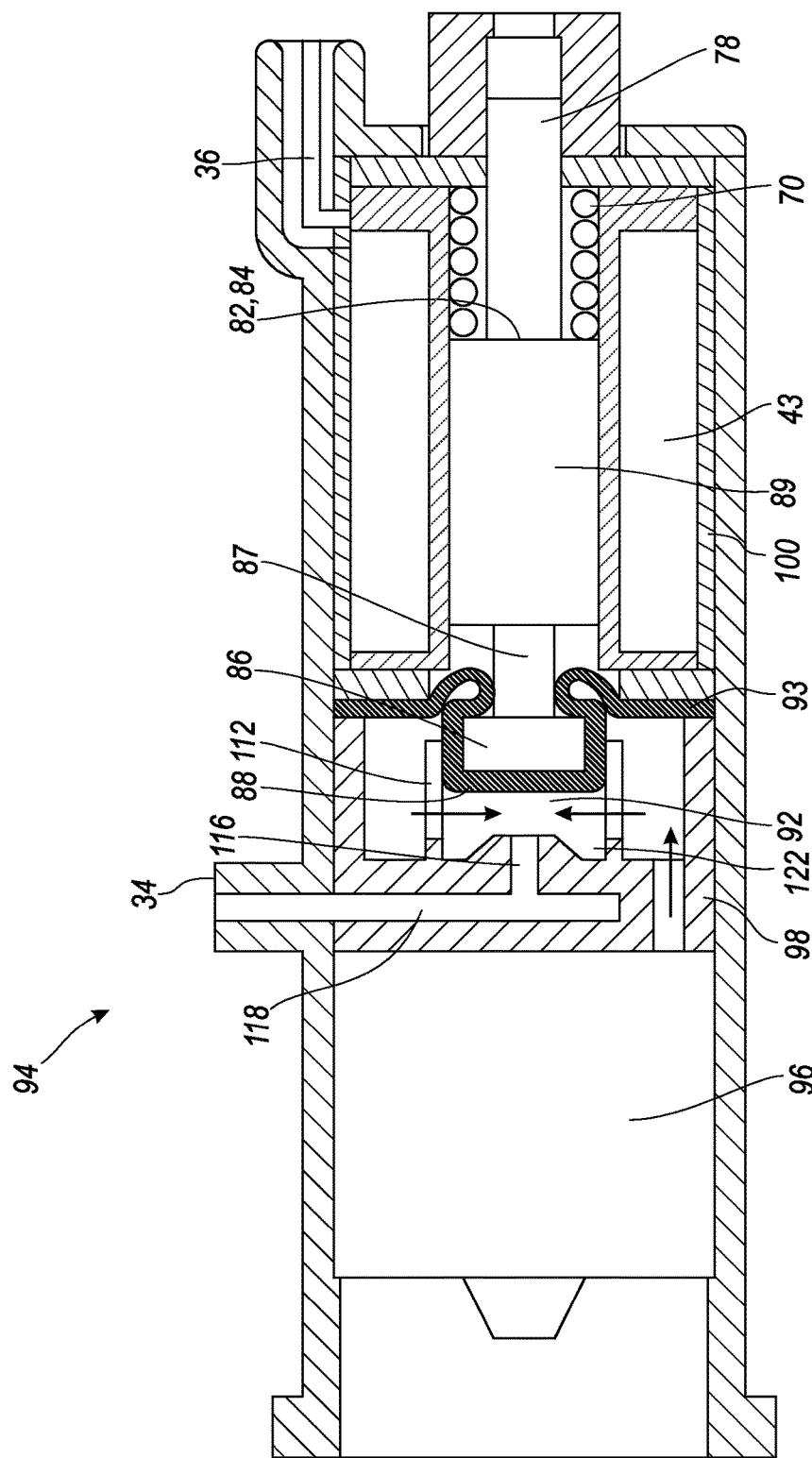

FIGS. 30 and 31 are schematic representations of the operation of cartridge valve 94, with FIG. 30 showing adjustable stroke solenoid 100 in the closed position (diaphragm 74 seals off ring outlet 116 and gap 61 is present), and FIG. 31 showing it in the open position. In the open position, armature 72 is retracted to its retracted position, no gap 61 is present (armature 72's end 84 is stopped against adjustment screw 38's end 82), and gap 92 exists between diaphragm 74 and ring outlet 116. Flow arrows in FIG. 31 show fluid flowing from outside the flow ring 112 into the gap 92 (through slots 114). FIGS. 30 and 31 also demonstrate how flange 93 of solenoid diaphragm 74 rolls as the armature retracts, and maintains the seal between the flow module 98 and the armature.

As in the earlier described embodiment, the size of the gap 92 determines how much area of slots 114 is exposed for fluid flow from the one or more regulator outlets 110 to fluid outlet 34, and therefore controls the outlet flow rate. That is, as gap 92 is increased, a larger part of the slots 114 is exposed for outlet flow, thus increasing the outlet flow rate. Similarly, as gap 92 is decreased, a smaller part of the slots 114 is exposed for outlet flow, thus decreasing the outlet flow rate. The size, shape, number, and location of the slots 114 can be designed as appropriate for the particular system in which the valves will be used, and the size of the gap 92—and therefore the outlet flow rate—is determined by the setting of adjustment screw; the deeper adjustment screw is set, the smaller the gap 92, and vice versa.

As also shown in FIGS. 30 and 31, flow ring 112 may be formed with internal reserve space 122, which is spaced apart from ring outlet 116. When valve 94 is open, reserve space 122 fills with fluid, and when valve 94 is closed, fluid is trapped in the reserve space 122 at operating pressure. Also, flow module 98 is configured such that fluid from regulator 96 communicates with the space around diaphragm neck 91 (and armature neck 87). Pressure across armature head 86 is balanced by the trapped fluid in reserve space 122 and the fluid in the space around neck 91. This design allows use of a relatively small solenoid spring 70, and therefore a relatively small solenoid to overcome the spring for opening. As described above, this reduces cost, and saves space which allows for more service space.

Figure 32:
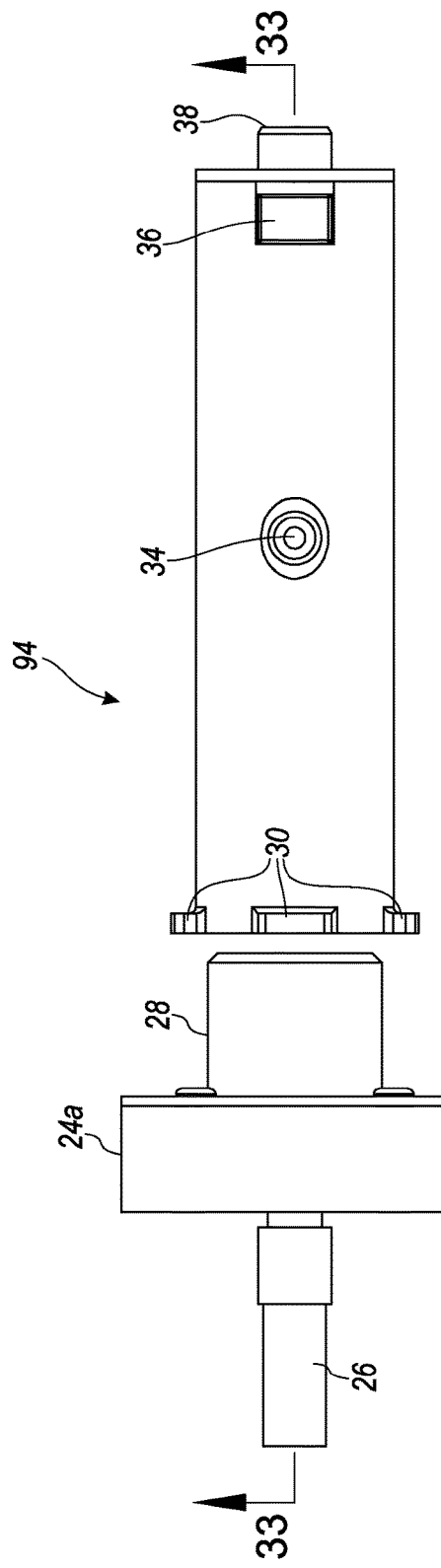
FIGS. 32 and 33 illustrate, respectively, top and sectional views of one embodiment of an uninstalled cartridge valve and backblock.
Figure 33:
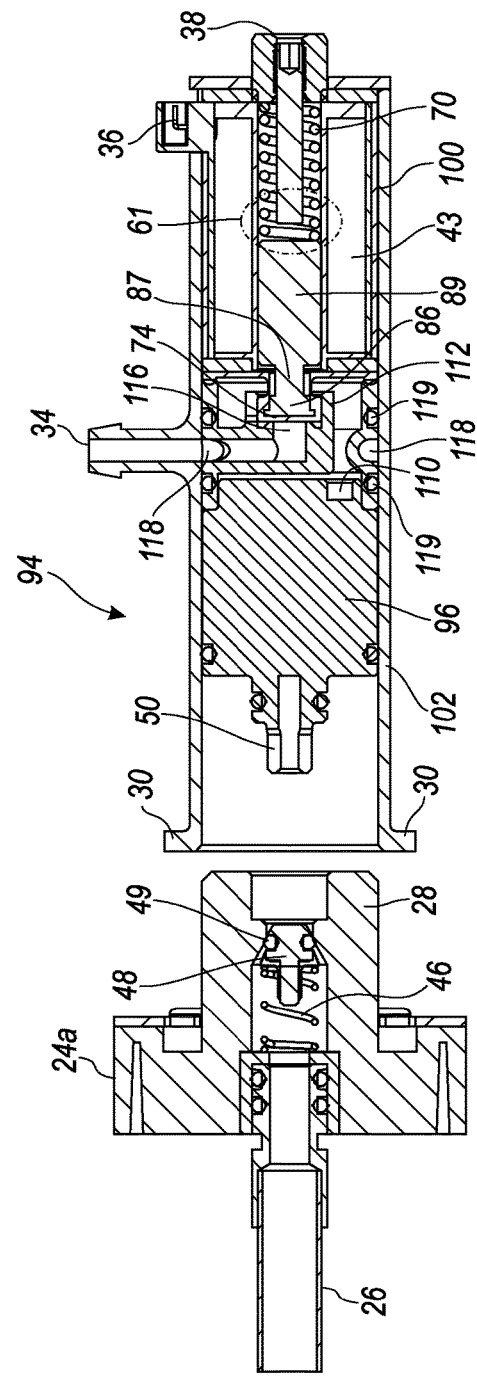

FIGS. 32 and 33 show top and sectional views of uninstalled cartridge valve 94, showing adjustable stroke solenoid 100 in its closed position. FIGS. 34 and 35 show angled top and sectional views of installed cartridge valve with adjustable stroke solenoid 100 in its retracted position. Regulator 96 is shown in block form.

Figure 36:
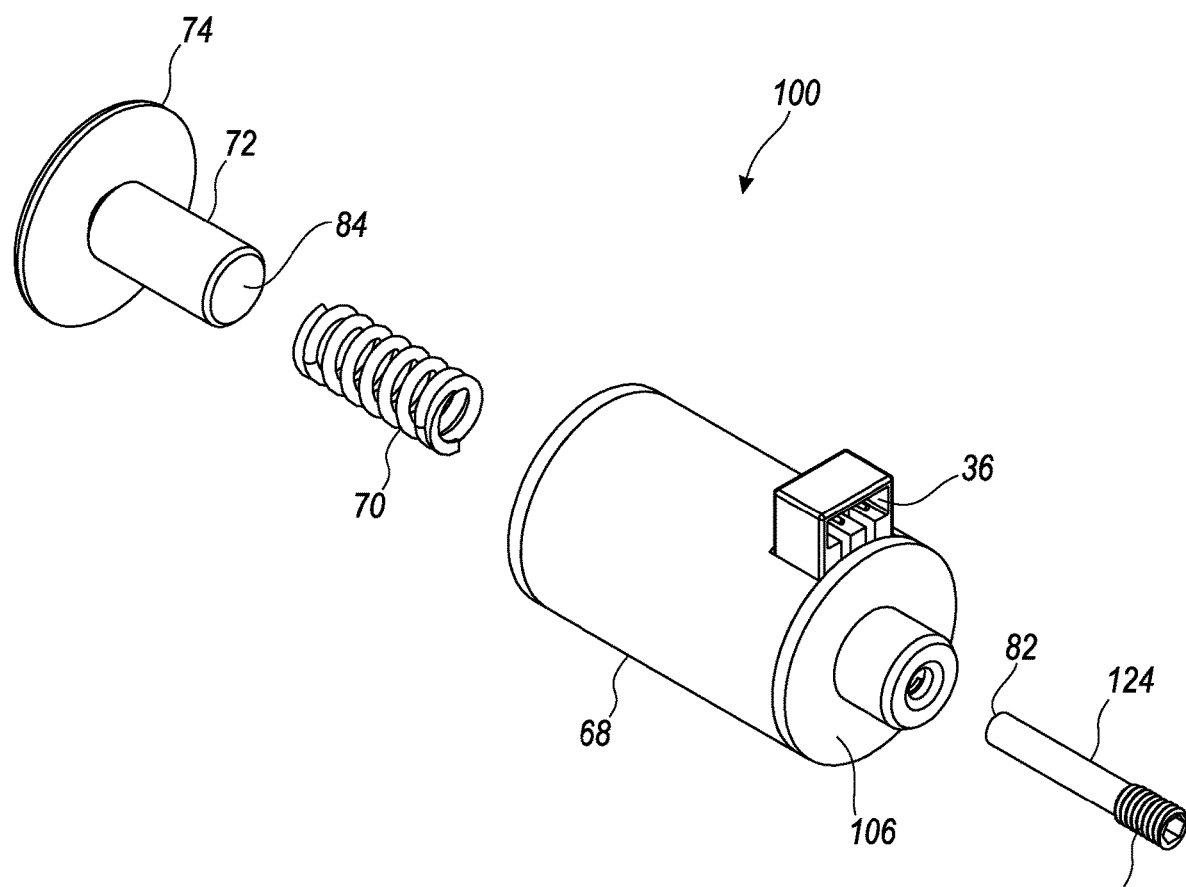
FIG. 36 illustrates an exploded view of one embodiment of an adjustable stroke solenoid.

FIG. 36 illustrates an exploded view of one embodiment of an adjustable stroke solenoid 100, showing one particular embodiment of an adjustment screw 124 and its threaded end 126.

The reciprocating action of the armature and solenoid diaphragm 74 within the flow ring (67 and 112) cleans the flow ring and the slots (69 and 114) of clogged particulate matter and some pulps. This cleaning function makes these embodiments particularly suited for use with, without limitation, both relatively consistent fluids and those that have varying amounts and sizes of particulate matter or pulp, such as, without limitation, juices.

Figure 37A:
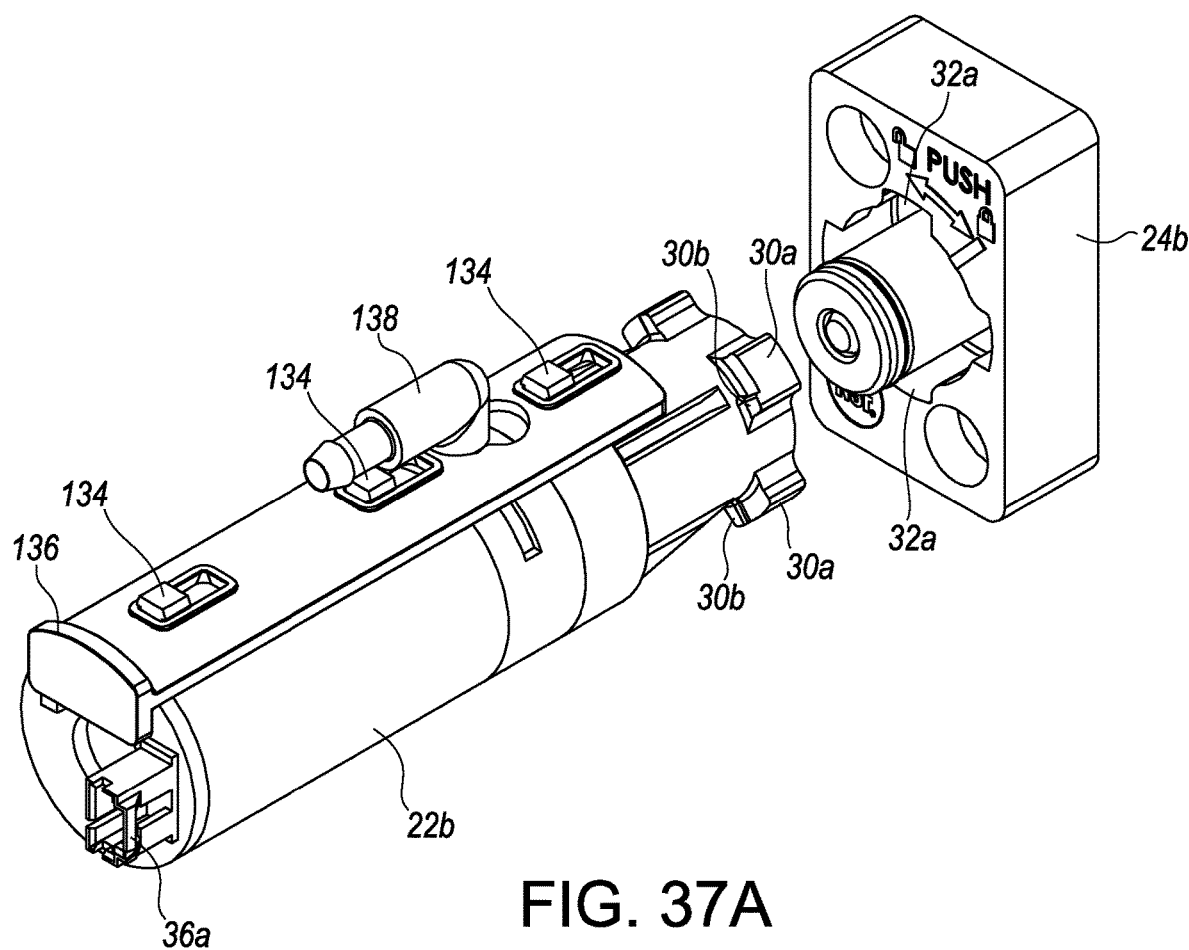
FIGS. 37a, 37b, and 38 illustrate alternatives for coupling a cartridge valve to a backblock and accessory options.
Figure 37B:
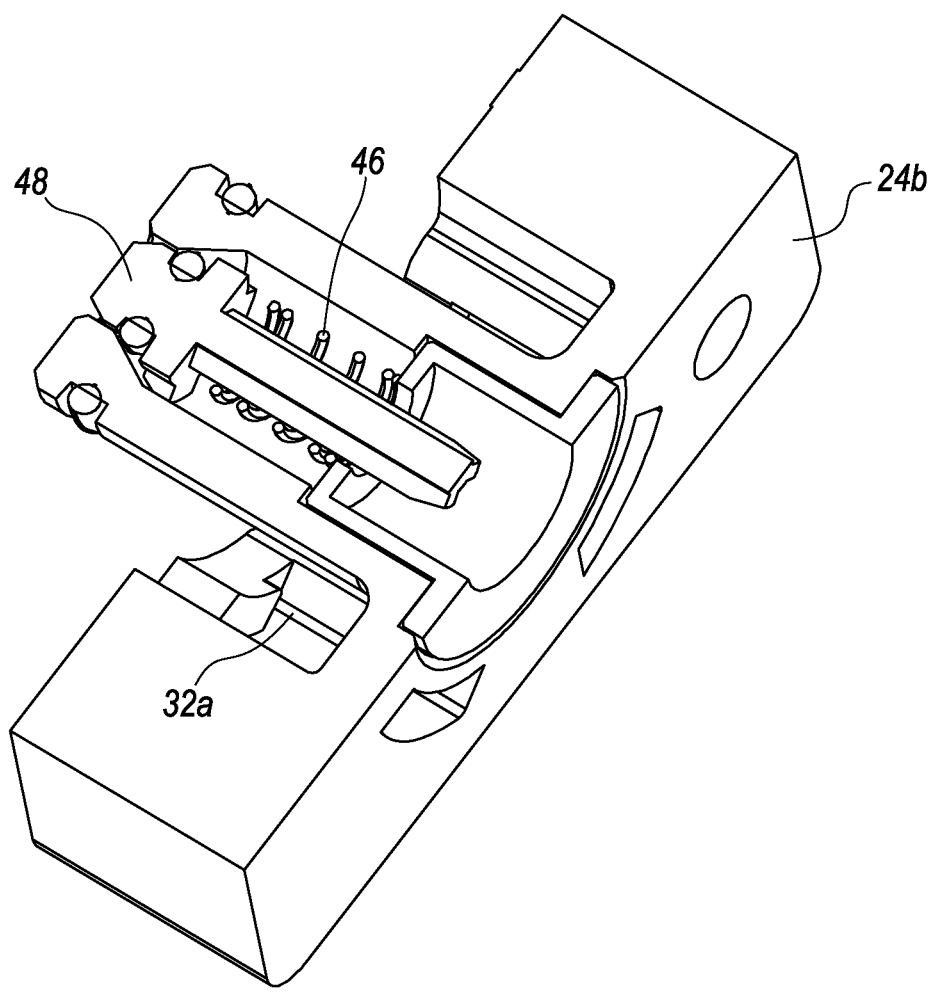

FIGS. 37a and 37b illustrate an alternative embodiment for coupling a cartridge valve to a backblock. As illustrated, cartridge valve 22b includes tabs (or retaining feet) 30a each having an anti-rotation boss 30b. The tabs 30a are inserted into and rotated within anti-rotation pocket 32a of backblock 24b, secured with an interference fit. Anti-rotation pocket 32a includes a matching contour for anti-rotational engagement with boss 30b.

Figure 38:
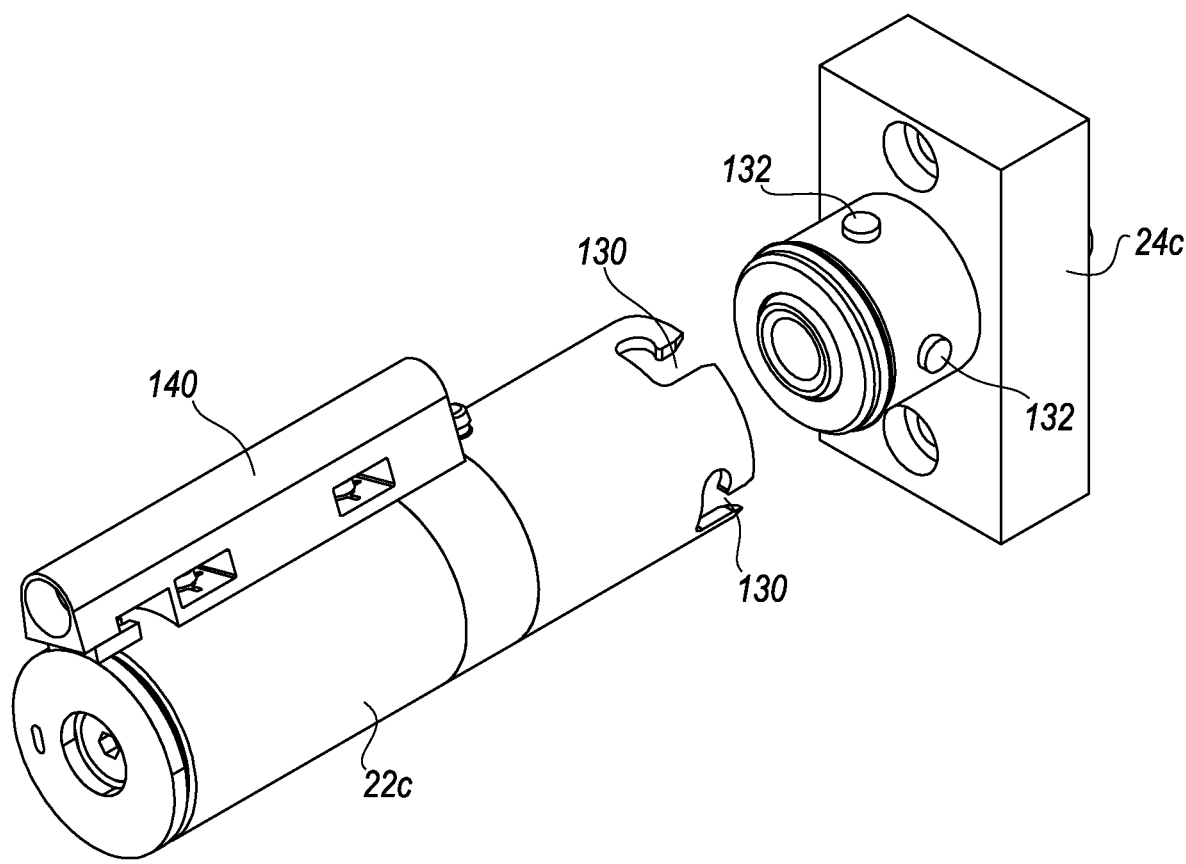

FIG. 38 illustrates another alternative embodiment for coupling a cartridge valve to a backblock. As illustrated, cartridge valve 22c includes retaining slots 130 for bayonet fitting with retaining bosses 132 of backblock 24c.

FIGS. 37a and 38 also illustrate that accessories may be attached to the cartridge valves described herein. As shown in FIG. 37a, accessory cleats 134 may be formed on the body of cartridge valve 22b, to secure accessories. In one non-limiting example, as shown in FIG. 37a, a slide-lock 136 is slidingly engaged with the cleats 134 and accessory fitting 138, creating an interference fit and locking accessory fitting 138. Any suitable accessory may be used. As another non-limiting example, FIG. 38 illustrates a flow director 140, which can be used to direct flow from fluid outlet 34 to a path parallel with the longitudinal axis of valve 22c.

Figure 39:
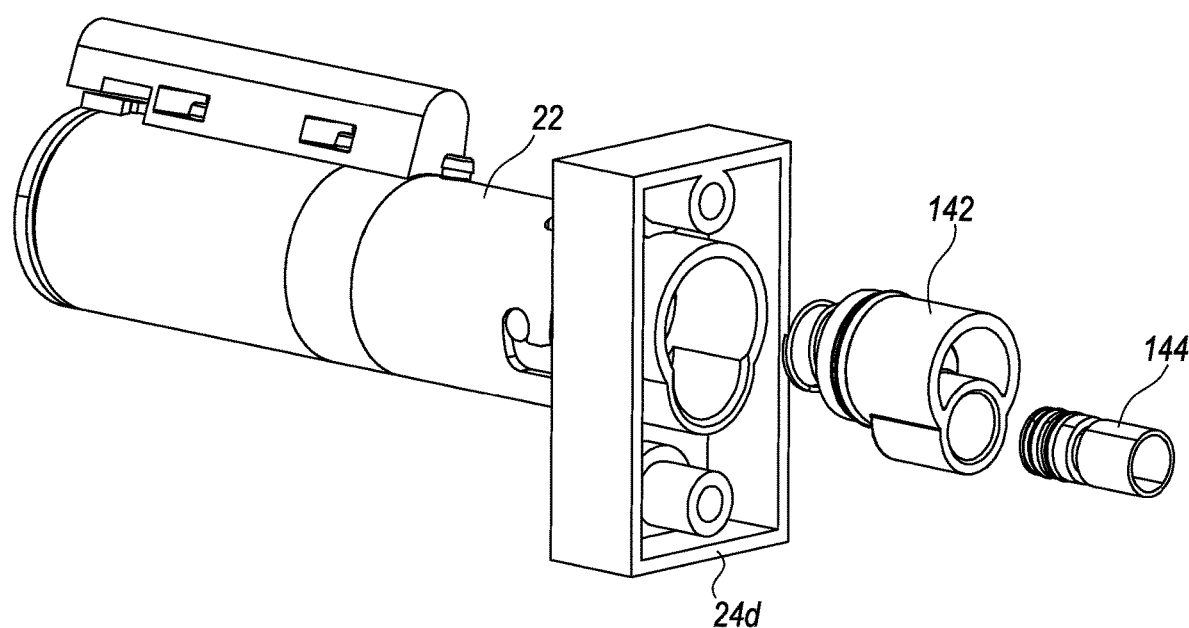
FIG. 39 illustrates one embodiment of an offset adapter for backwards compatibility with some existing systems.

FIG. 39 illustrates one embodiment of an offset adapter 142 for backwards compatibility with some existing systems. In some existing post-mix dispensing systems, the spacing of water and syrup outlet connectors may prevent direct connection of one or more of the backblocks 24 (e.g., 24a, 24b, 24c) discussed herein. That is, when one discrete backblock 24 is installed, its position may interfere with installation of another. To obviate this problem, offset adapter 142 is provided to connect with the appropriate outlet connector 144 in an offset position (not centered with valve 22) and direct its flow within backblock 24d to valve 22, to accommodate spacing of two or more discrete backblocks 24.

Furthermore, the overall design configuration of the shown valve embodiments, a substantially straight cylinder, allows for a relatively high installed density, with relatively close mounting spacing. In a particular example, the backblock 24 shown in FIGS. 2 and 3 (for 4 valves) may be approximately 4 inches wide by 3.75 inches tall, and the cartridge valve housing may have an outside diameter of approximately 1 inch. Furthermore, the 4 cartridge valves installed in the backblock are shown in a staggered arrangement, which advantageously allows for a reduction in backblock size in at least one dimension, thereby providing flexibility of design to accommodate space requirements of the system in which the cartridge valves will be used. However, the sizes and arrangements may vary depending on the requirements of the system.

Although this description of the present invention has been described largely in terms of liquid fluids, it may also be used with gaseous fluids and gaseous fluid systems. Also, the terms couple or coupled as used herein include direct coupling or indirect coupling through intermediate members.

Particular features of each of the embodiments disclosed herein may be interchanged with those of the other embodiments. Also, valve 22 or 94 may be combined with a valve having a fixed outlet orifice (such as, without limitation, those disclosed herein, or ones without a flow ring and slots, but without an adjustment mechanism) to simplify ratio adjustment (e.g., in a post-mix dispenser with a beverage base valve and a water valve for forming a finished beverage, the beverage base valve may be adjustable as described herein, but the water valve may have a fixed orifice between the regulator and the outlet for an un-adjustable constant flow, and thus only one adjustment would be made in such a case).

Although the present invention has been described in detail, it should be understood that various changes, alterations, substitutions, additions, and modifications could be made without departing from the intended scope of the invention, as defined in the following claims.

What is claimed is:

1. A valve, comprising:
a fluid inlet;
a fluid outlet;
a regulator coupled to the fluid inlet and having a regulator outlet; and
a solenoid, comprising:
an armature configured to retract a retraction distance from a closed position to a retracted position, the armature adapted to stop fluid flow between the regulator outlet and the fluid outlet in the closed position; and
an adjustable stop configured to adjustably set the retraction distance.

2. The valve of claim 1, wherein the adjustable stop comprises an adjustment screw, the adjustment screw including a shaft with an armature end that restricts retraction of the armature beyond the retracted position.

3. The valve of claim 1, and further comprising a flow ring surrounding the regulator outlet, the flow ring including at least one slot in fluid communication with the regulator outlet and the fluid outlet, the fluid outlet being outside the flow ring, and wherein increasing the retraction distance exposes a larger part of the at least one slot.

4. The valve of claim 3, wherein the flow ring has an inside diameter, the valve further comprising a diaphragm coupled to a regulator end of the armature, the diaphragm including a first section adapted to close the regulator outlet in the closed position, and a second section having an outside diameter equal to or greater than the inside diameter of the flow ring.

5. The valve of claim 1, and further comprising a flow ring surrounding a ring outlet, the ring outlet in fluid communication with the fluid outlet, the flow ring including at least one slot in fluid communication with the regulator outlet, the regulator outlet being outside the flow ring, and wherein increasing the retraction distance exposes a larger part of the at least one slot.

6. The valve of claim 5, wherein the flow ring has an inside diameter, the valve further comprising a diaphragm coupled to a regulator end of the armature, the diaphragm including a first section adapted to close the ring outlet in the closed position, and a second section having an outside diameter equal to or greater than the inside diameter of the flow ring.

7. The valve of claim 1, and further comprising a diaphragm coupled to a regulator end of the armature, the diaphragm adapted to isolate the armature from fluid flowing from the regulator outlet.

8. The valve of claim 1, and further comprising a diaphragm coupled to a regulator end of the armature, the diaphragm including a first section adapted to close fluid communication between the regulator outlet and the fluid outlet in the closed position, and a second section adapted to isolate the armature from fluid flowing from the regulator outlet.

9. The valve of claim 1, and further comprising a fluid passageway from the regulator outlet to the fluid outlet, wherein the fluid passageway is closed by the armature in the closed position, and wherein increasing the retraction distance increases fluid flow through the fluid passageway.

10. The valve of claim 1, and further comprising tabs extending from the valve, the tabs adapted to couple with a backblock in a bayonet fitting arrangement.

11. The valve of claim 1, and wherein the regulator and solenoid are arranged in a substantially linear arrangement, and housed axially in a substantially cylindrical housing.

12. The valve of claim 1, wherein the regulator and solenoid are arranged substantially linearly.

13. The valve of claim 1, wherein the fluid outlet is positioned between the regulator and the solenoid.

14. A beverage dispensing system, comprising:
a water valve coupled to a water inlet;
a beverage base valve coupled to a beverage base inlet;
a user interface;
a controller coupled to the water valve, the beverage base valve, and the user interface;
a nozzle;
wherein the water valve and the beverage base valve each comprise:
a fluid inlet;
a fluid outlet coupled to the nozzle;
a regulator coupled to the fluid inlet and having a regulator outlet; and
a solenoid, comprising:
an armature configured to retract a retraction distance from a closed position to a retracted position, the armature adapted to stop fluid flow between the regulator outlet and the fluid outlet in the closed position; and
an adjustable stop configured to adjustably set the retraction distance; and
wherein the controller, in response to the user interface, is operable to activate the water valve and the beverage base valve to dispense water and beverage base to form a finished beverage.

15. The system of claim 14, wherein the water comprises carbonated water.

16. The system of claim 14, wherein each adjustable stop comprises an adjustment screw, the adjustment screw including a shaft with an armature end that restricts retraction of the armature beyond the retracted position.

17. The system of claim 14, each valve further comprising a flow ring surrounding the regulator outlet, the flow ring including at least one slot in fluid communication with the fluid outlet, the fluid outlet being outside the flow ring, and wherein increasing the retraction distance exposes a larger part of the at least one slot.

18. The system of claim 14, each valve further comprising a flow ring surrounding a ring outlet, the ring outlet in fluid communication with the fluid outlet, the flow ring including at least one slot in fluid communication with the regulator outlet, the regulator outlet being outside the flow ring, and wherein increasing the retraction distance exposes a larger part of the at least one slot.

19. The system of claim 14, and further comprising:
a backblock adapted to respectively couple the water inlet and beverage base inlet to the water valve and beverage base valve, the backblock including a water shut-off valve coupled to the water inlet and a beverage-base shut-off valve coupled to the beverage base inlet, and
tabs extending from the water valve and the beverage base valve, the tabs adapted to couple the respective water valve and beverage base valve with the backblock in a bayonet fitting arrangement, and wherein the coupled water valve opens the water shut-off valve, and the coupled beverage base valve opens the beverage-base shut-off valve.

20. The system of claim 14, each valve further comprising a fluid passageway from the regulator outlet to the fluid outlet, wherein the fluid passageway is closed by the armature in the closed position, and wherein increasing the retraction distance increases fluid flow through the fluid passageway.

* * * * *